(12) United States Patent
Ishikawa et al.

(10) Patent No.: US 10,637,845 B2
(45) Date of Patent: *Apr. 28, 2020

(54) PRIVACY-AWARE ID GATEWAY

(71) Applicant: INTERNATIONAL BUSINESS MACHINES CORPORATION, Armonk, NY (US)

(72) Inventors: Miki Ishikawa, Kanagawa-ken (JP); Yuji Watanabe, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 59 days.

This patent is subject to a terminal disclaimer.

(21) Appl. No.: 15/656,353

(22) Filed: Jul. 21, 2017

(65) Prior Publication Data
US 2019/0028461 A1    Jan. 24, 2019

(51) Int. Cl.
*H04L 29/06* (2006.01)
*G06F 21/30* (2013.01)
*G06F 21/31* (2013.01)
*G06F 21/41* (2013.01)
*G06F 21/44* (2013.01)

(52) U.S. Cl.
CPC ........ *H04L 63/0815* (2013.01); *H04L 63/102* (2013.01); *G06F 21/30* (2013.01); *G06F 21/31* (2013.01); *G06F 21/41* (2013.01); *G06F 21/445* (2013.01)

(58) Field of Classification Search
CPC ... H04L 63/102; H04L 63/0815; H04L 29/06; G06F 21/30; G06F 21/31; G06F 21/41; G06F 21/445; G06F 21/44
See application file for complete search history.

(56) References Cited

U.S. PATENT DOCUMENTS 7,221,935 B2 *  5/2007  Barriga-Caceres ..... G06F 21/33
                                                 455/411
7,647,628 B2    1/2010  Kebinger et al.
(Continued)

OTHER PUBLICATIONS

List of IBM Patents or Patent Applications Treated as Related dated Nov. 6, 2017, 2 pages.
(Continued)

*Primary Examiner* — Jayesh M Jhaveri
(74) *Attorney, Agent, or Firm* — Tutunjian & Bitetto, P.C.; Vazken Alexanian

(57) ABSTRACT

A computer readable medium, apparatus, system, and method for performing identification (ID) operations using a processor or programmable circuitry. The processor configures ID federations between a federation server and applications. The processor is further configured to receive a first authentication request for authenticating a first user who has been authenticated on a first application among the applications with a first user ID using an ID federation. The processor is also configured to check the first user ID to determine whether the first user is authorized to access information of a second user on a second application and send a second authentication request to a second application, the second authentication request for authenticating the first user with a second user ID, which is associated with the second user, using an ID federation between the federation server and the second application.

15 Claims, 13 Drawing Sheets

(56) References Cited

U.S. PATENT DOCUMENTS

| | | | |
|---|---|---|---|
| 7,849,204 B2* | 12/2010 | Yared | G06F 21/41 709/217 |
| 8,214,394 B2* | 7/2012 | Krishnaprasad | H04L 63/0815 707/781 |
| 8,756,704 B2 | 6/2014 | Castellucci et al. | |
| 8,769,650 B2 | 7/2014 | Gargaro et al. | |
| 9,098,675 B1* | 8/2015 | Roth | G06F 21/00 |
| 2002/0184507 A1* | 12/2002 | Makower | H04L 63/0428 713/182 |
| 2006/0218630 A1 | 9/2006 | Pearson et al. | |
| 2008/0072301 A1* | 3/2008 | Chia | G06F 21/41 726/8 |
| 2009/0119763 A1* | 5/2009 | Park | H04L 63/0815 726/8 |
| 2009/0249439 A1* | 10/2009 | Olden | H04L 63/0815 726/1 |
| 2012/0151568 A1* | 6/2012 | Pieczul | H04L 63/0815 726/8 |
| 2013/0269017 A1* | 10/2013 | Patil | G06F 21/41 726/8 |
| 2014/0013387 A1 | 1/2014 | Vangpat et al. | |
| 2014/0108474 A1 | 4/2014 | David et al. | |
| 2015/0007263 A1* | 1/2015 | Stewart | H04L 63/08 726/3 |
| 2017/0324730 A1* | 11/2017 | Otranen | H04L 63/08 |
| 2018/0013819 A1* | 1/2018 | Li | G06F 9/5055 |

OTHER PUBLICATIONS http://docops.ca.com/ca-single-sign-on/12-52-sp1/en/configuring/partnership-federation/application-integration-at-the-relying-party/redirect-a-user-to-the-target-application-relying-party, Oct. 14, 2015 (Year:2015).

Sebastian Peytrott, What is and how does Single Sign on work?, https://auth0.com/blog/what-is-and-how-does-single-sign-on-work/, Aug. 18, 2016.

Office Action for U.S. Appl. No. 15/251,562 dated Jul. 18, 2018.

List of IBM Patents or Patent Applications Treated as Related dated Apr. 16, 2018, 2 pages.

List of IBM Patents or Patent Applications Treated as Related dated Jul. 21, 2017, 2 pages.

U.S. Office Action issued in U.S. Appl. No. 15/251,562 dated May 14, 2019, 17 pages.

Notice of Allowance issued in U.S. Appl. No. 15/804,434 dated Nov. 26, 2019, 10 pages.

* cited by examiner

| Group ID | App ID     |
|----------|------------|
| 1        | App1, App4 |
| 2        | App2, App3 |

FIG. 5

| FM ID | APP1 ID | APP2 ID | APP3 ID | APP4 ID      |
|-------|---------|---------|---------|--------------|
| 1     | miki    | Miki_xx | 0425    | miki@xx.com  |
| 2     | yuji    | Yuji_yy | 5217    | yuji@yy.com  |

| ID      | Password  | E-mail       |
|---------|-----------|--------------|
| Miki_xx | ******** | miki@xx.com  |
| Yuji_yy | ******** | yuji@yy.com  |

| Requester | Data Holder | Condition | User |
|---|---|---|---|
| App1 (APP1) | App4 (APP4) | {Time: 11/1-11/30} {Record ID: [r1-r10]} | u4 |

PRIVACY-AWARE ID GATEWAY

BACKGROUND

Technical Field

The present invention relates to single-sign-on and identification (ID) gateway.

Description of the Related Art

Single Sign-On (SSO) reduces the burden of inputting a set of ID and password for a plurality of web applications by users. While an authentication server can be used as an ID provider in order to facilitate SSO, the authentication server has to manage IDs and passwords of all users, the number of which can increase drastically as the number of web applications increases. Furthermore, one user can wish to provide another user with its own information by letting the other user to sign-on as the one user. These can require an exhaustive amount of computational resources.

SUMMARY

According to a first aspect of the present invention, provided is a computer program product including one or more computer readable storage mediums collectively storing program instructions that are executable by a processor or programmable circuitry to cause the processor or programmable circuitry to perform operations including: configuring a plurality of ID federations between a federation server and a plurality of applications such that each ID federation is between the federation server and one of the plurality of applications; receiving a first authentication request for authenticating a first user who has been authenticated on a first application among the plurality of applications with a first user ID using an ID federation between the first application and the federation server from among the plurality of ID federations, and checking the first user ID to determine whether the first user is authorized to access information of a second user on a second application among the plurality of applications, sending a second authentication request to a second application among the plurality of applications, the second authentication request being for authenticating the first user with a second user ID, which is associated with the second user, using an ID federation between the federation server and the second application from among the plurality of ID federations.

The first aspect can include a method performed by the processor executing the instructions. The first aspect can also include an apparatus comprising the above computer readable medium, and a processor or programmable circuitry operable to execute the instructions. The first aspect can further include a system comprising the above apparatus as a federation server and one or more application servers operable to execute the plurality of applications, and a method performed by the system.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 5 shows a group table according to an embodiment of the present invention.

FIG. 6 shows a mapping table according to an embodiment of the present invention.

FIG. 7 shows a user table according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
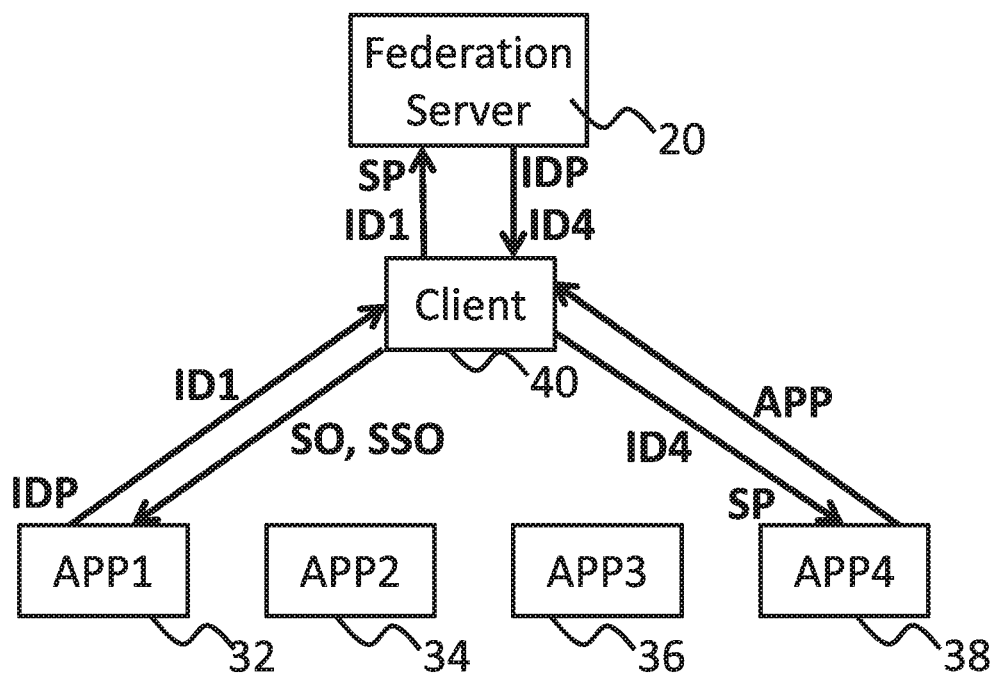
FIG. 1 shows an exemplary configuration of a system 10, according to an embodiment of the present invention.

FIG. 1 shows an exemplary configuration of a system 10, according to an embodiment of the present invention. The system 10 can perform SSO based on ID federations between a federation master and a plurality of applications. The system 10 can comprise a federation server 20 acting as the federation master and a plurality of application servers (e.g., application servers 32, 34, 36 and 38).

In the embodiment of FIG. 1, the application server 32 can provide a client computer 40 with an application service 1 (shown as "APP1"), the application server 34 can provide the client computer 40 with an application service 2 (shown as "APP2"), the application server 36 can provide the client computer 40 with an application service 3 (shown as "APP3"), and the application server 38 can provide the client computer 40 with an application service 4 (shown as "APP4"). The client computer 40 can be a desktop computer, a laptop computer, a server computer, a tablet computer, a mobile phone, a smart phone, a mobile device, a PDA, a wearable device, a home appliance, a terminal computer, or any other type of computer or device capable of executing an application service.

Each of the application servers 32-38 can require user authentication before providing the client computer 40 with the application service. Without SSO, the client computer has to complete the user authentication for each application, whenever the client computer requires each application service.

According to some embodiments of the present invention, the federation server 20 and the application servers 32-38 can perform SSO by operating as both an ID Provider (IDP) and a Service Provider (SP). For example, the federation server 20 and each of the application servers 32-38 can collectively form an ID federation for providing ID information.

The application server 32 can receive authentication information (e.g., a first user ID and a password of user of the client computer 40 used for APP1) from the client computer 40, and authenticate the user based on the authentication information. Then, the application server 32 can receive a sign-on request from the client computer 40.

If the authentication is successful, then the application server 32 can act as the IDP to provide the federation server 20 with the first user ID of the user via the client computer 40. The federation server 20 can act as the SP to receive the ID1 from the IDP, and then can convert the first user ID of the user to a second user ID of the user used for APP4. Conversion of the first user ID to the second user ID can include simply replacing the first user ID with the second user ID without manipulation of the first user ID. The federation server 20 can then act as the IDP to provide the application server 38 with the second user ID of the user via the client computer 40. The application server 38 can act as the SP to receive the second user ID of the user and to provide the client computer 40 with application service of APP4 for the user of the second user ID.

Figure 2:
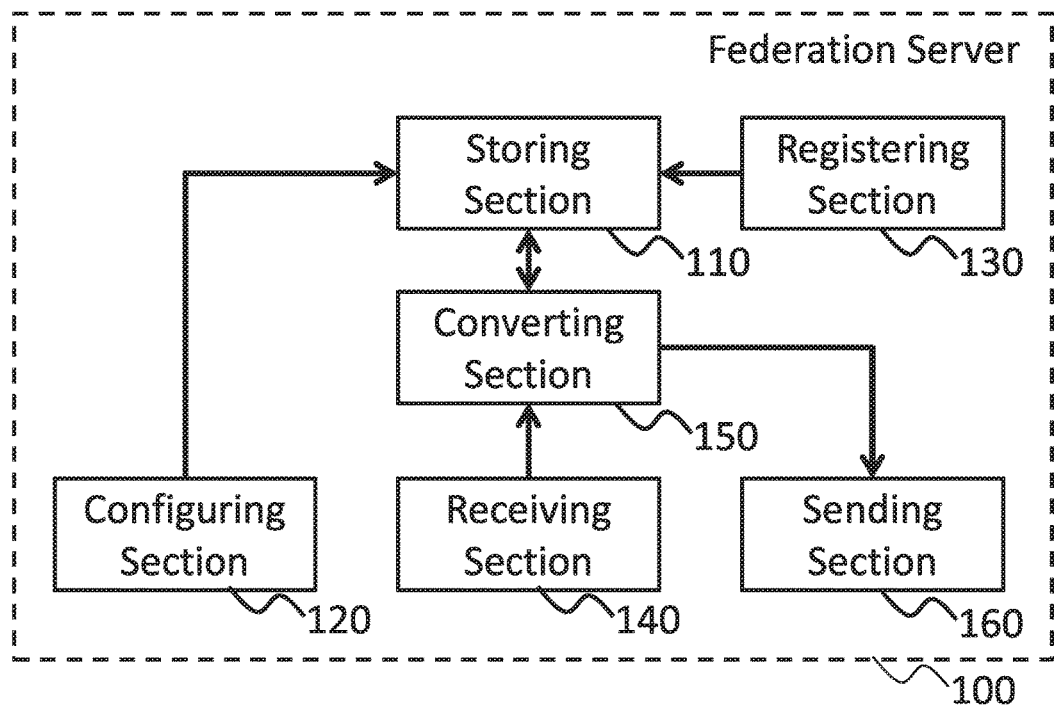
FIG. 2 shows an exemplary configuration of a federation server 100, according to an embodiment of the present invention.

FIG. 2 shows an exemplary configuration of a federation server 100, according to an embodiment of the present invention. The federation server 20 in FIG. 1 can be implemented by the federation server 100.

The federation server 100 can be an apparatus comprising a processor or programmable circuitry and one or more computer readable mediums collectively including instructions embedded therewith. The instructions, when executed by the processor, can cause the processor or the programmable circuitry of the federation server 100 to operate as a plurality of operating sections. Thereby, the federation server 100 can be regarded as comprising: a storing section 110, a configuring section 120, a registering section 130, a receiving section 140, a converting section 150, and a sending section 160. A computer program product including one or more computer readable storage mediums collectively storing the program instructions can also be provided.

The storing section 110 can store a variety of data used for operations of the federation server 100. In one embodiment, the storing section 110 can comprise a volatile, non-volatile or non-transitory memory, and can be the same computer readable medium on which one or more of the instructions are stored. One or more other operating sections in the federation server 100 (e.g., the configuring section 120 and the converting section 150) can communicate data directly or via the storing section 110.

The configuring section 120 can configure a plurality of ID federations between the federation server 100 and a plurality of applications (e.g., APP1, . . . , APP4 in FIG. 1) such that each ID federation is between the federation server 100 and one of the applications. In one embodiment, the configuring section 120 can perform the configuration before a client computer (e.g., the client computer 40 in FIG. 1) sends a Single Sign-On request (which can be referred to as an SSO request). The configuring section 120 can store a result of the configuration in the storing section 110.

The registering section 130 can receive information relating to an ID mapping of the user, and register the ID mapping of the user. In one embodiment, the ID mapping can indicate at least a correspondence between a first user ID on the first application (e.g., APP1 in FIG. 1) and a second user ID on the second application (e.g., APP4 in FIG. 1). The registering section 130 can receive and store the ID mapping of one or more users for the plurality of application, in the storing section 110.

The receiving section 140 can receive a first authentication request for authenticating a user using an ID federation between a first application and the federation server 100 from among the plurality of ID federations, from the client computer of the user (which can hereinafter be referred to as target user). The first application can be one (e.g., APP1 in FIG. 1) of the plurality of applications (e.g., APP1, . . . , APP4), and the target user has been authenticated on the first application before the client computer of the target user sends the first authentication request.

The first authentication request can include the first user ID of the target user for the first application (e.g., APP1) and an identification of the second application (e.g., APP4), in which the target user wishes to sign-on by SSO. The receiving section 140 can provide the converting section 150 with the received first authentication request including the first user ID directly or via the storing section 110.

The converting section 150 can convert the first user ID indicated in the first authentication request to the second user ID of the second application based on the ID mapping. The second application can be one from among the plurality of ID federations. In one embodiment, the converting section 150 can read the ID mapping stored in the storing section 110, and convert the first user ID of the target user for the first application (e.g., APP1), to the second user ID of the target user for the second application (e.g., APP4). The converting section 150 can provide the sending section 160 with the second user ID of the target user directly or via the storing section 110.

The sending section 160 can send a second authentication request to the second application (e.g., APP4) of the plurality of applications for authenticating the target user using an ID federation between the federation server 100 and the second application.

Figure 3:
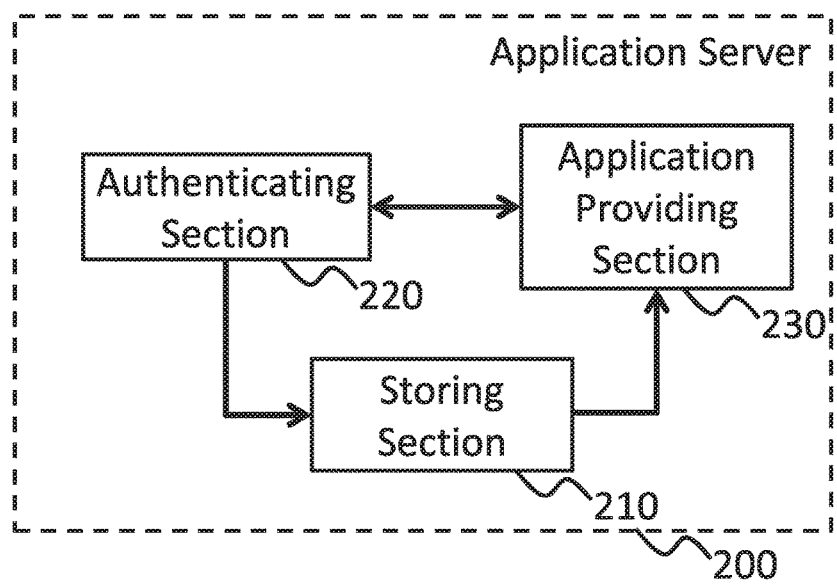
FIG. 3 shows an exemplary configuration of an application server 200, according to an embodiment of the present invention.

FIG. 3 shows an exemplary configuration of an application server 200, according to an embodiment of the present invention. At least one of the application servers 32-38 in FIG. 1 can be implemented by the application server 200.

The application server 200 can be an apparatus comprising a processor or programmable circuitry and one or more computer readable storage mediums collectively including program instructions embedded therewith. The instructions, when executed by the processor, can cause the processor or the programmable circuitry of the application server 200 to operate as a plurality of operating sections. Thereby, the application server 200 can be regarded as comprising: a storing section 210, an authenticate section 220, and an application section providing section 230. A computer program product including one or more computer readable storage mediums collectively storing the program instructions can also be provided.

The storing section 210 can store a variety of data used for operations of the application server 200. In one embodiment, the storing section 210 can comprise a volatile, non-volatile or non-transitory memory, and can be the same computer readable medium on which one or more of the instructions are stored. One or more other operating sections in the application server 200 (e.g., the authenticating section 220 and the application providing section 230) can communicate data directly or via the storing section 210.

The authenticating section 220 can authenticate the target user on an application. In one embodiment, the authenticating section 220 in the application server 32 (providing APP1 in FIG. 1) can authenticate the target user on the application APP1.

The authenticating section 220 can receive an SSO request from the client computer of the target user. Then, the authenticating section 220 can generate the first authentication request of the target user based on the SSO request.

The authenticating section 220 can send the first authentication request of the target user to the receiving section of the federation server, such as federation server 20. In one embodiment, the authenticating section 220 in the application server 32 can send the first authentication request to the receiving section of the federation server via the client computer, such as client computer 40.

The authenticating section 220 can receive the second authentication request from the sending section, such as sending section 160, of the federation server. The authenticating section can complete authentication of the target user on an application based on the second authentication request. In one embodiment, the authenticating section 220 in the application server 38 (providing APP4 in FIG. 1) can authenticate the target user on the application APP4. The authenticating section 220 can provide the application providing section 230 with a result of the authentication, directly or via the storing section 210.

The application providing section 230 can provide the client computer with an application service (e.g., a web application service) based on the result of the authentication. In one embodiment, the application providing section 230 can provide only the client computer of the target user authenticated by the authenticating section 220 with the application service.

Figure 4:
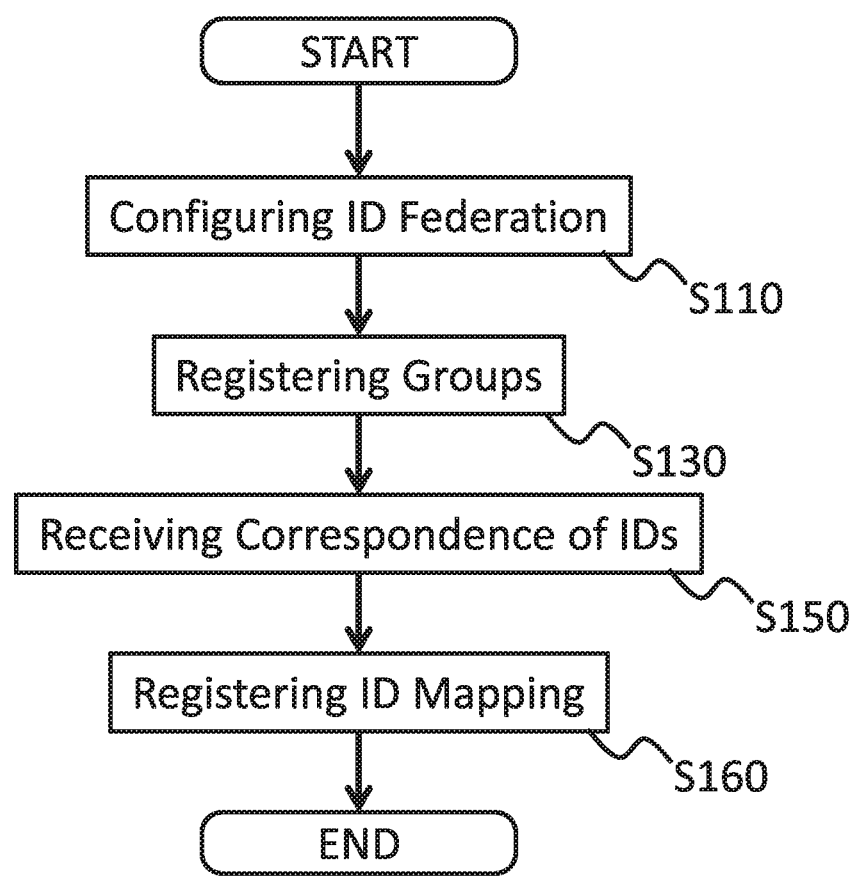
FIG. 4 shows a first operational flow according to an embodiment of the present invention.

FIG. 4 shows a first operational flow according to an embodiment of the present invention. The present embodiment describes an example in which a federation server, such as the federation server 20 and/or 100 performs the operations from S110 to S160, as shown in FIG. 4. The federation server can the configure ID federations and generate the ID mapping by performing the operation of S110-S160. The federation server can perform the operation of FIG. 4 before utilizing the ID federations, as further explained below in FIG. 8.

At S110, a configuring section of a federation server (e.g., the configuring section 120 of the federation server 100 in FIG. 2) can configure a plurality of ID federations between the federation server and a plurality of application servers (e.g., the application servers 32-38 in FIG. 1 and/or the application server 200 in FIG. 3) providing a plurality of applications (e.g., APP1-4 in FIG. 1).

In one embodiment, the configuring section can configure an ID federation between the federation server and each application server among the plurality of application servers. In the embodiment, the federation server and each application server can authenticate each other. For example, the federation server and each application server can perform the authentication by exchanging certificates with each other based on Public-Key Infrastructure (PKI). In another example, the federation server and each application server can exchange SAML metadata that includes a certificate and information of an IDP endpoint.

In one embodiment, the configuring section can configure bidirectional ID federations between the plurality of application servers and the federation server. In the embodiment, after the authentication, the federation server can register each application server both as IDP and SP, and each application server can register the federation server both as IDP and SP.

In other embodiments, the configuring section can configure unidirectional ID federations between (i) at least one application server among the plurality of application servers and (ii) the federation server, and a bidirectional ID federation between (a) the rest of the application servers among the plurality of application servers and (b) the federation server. In these embodiments, the configuring section can configure a first unidirectional ID federation directed from the application server of the first application (e.g., APP1) to the federation server and a second unidirectional ID federation directed from the federation server to the application server of the second application (e.g., APP4).

In these embodiments, after or in response to the authentication, the federation server can register the application server of the first application as IDP, and the application server of the first application can register the federation server as SP in the ID federation thereof. Also, the application server of the second application can register the federation server as IDP, and the federation server can register the application server of the second application as SP in the ID federation thereof. Thereby, the federation server can allow a flow of SSO from a relatively secure application to other applications, and ban an opposite flow, such as from an application to a more secure application.

In some embodiments, the configuring section can register a relationship among the plurality of applications, where the relationship defines one or more applications that are allowed to login from each application using the plurality of ID federations. For example, the configuring section can register the relationships of applications to enable an SSO from one application (e.g., application requiring relatively high security) to another application (e.g., application requiring relatively low security) but disable a reciprocal SSO. In one embodiment, the configuring section can receive the relationship(s) from the user of the federation server.

At S130, the configuring section can register a group of two or more applications of the plurality of applications. The two or more applications in a group can allow authentications using the plurality of ID federations, as explained later. In one embodiment, the configuring section can register group information of the plurality of applications and the group information can define to which group each of the plurality of applications belongs. In one embodiment, the configuring section can receive the group information by the user of the federation server, or the application servers.

FIG. 5 shows a group table according to an embodiment of the present invention. In one embodiment, the configuring section can receive the group information represented by the group table of FIG. 5. In the embodiment, APP1 (shown by Application ID:App1) and APP4 (shown by Application ID:App4) belong to the same group (Group 1), and APP2 (shown by Application ID:App2) and APP3 (shown by Application ID:App3) belong to the same group (Group 2). The configuring section can store the group information in the storing section of the federation server.

At S150, a registering section, such as the registering section 130, can receive correspondence information of IDs of an application and IDs of another application. In one embodiment, the registering section can receive correspondence information of IDs of a plurality of users for all pairs of applications. In the embodiment, the registering section can receive correspondence information of IDs of APP1 for a plurality of users and IDs of APP2 for a plurality of users, correspondence information of IDs of APP1 for a plurality of users and IDs of APP3 for a plurality of users, . . . , correspondence information of IDs of APP3 for a plurality of users and IDs of APP4 for a plurality of users, for APP1-APP4.

In one embodiment, the registering section can receive correspondence information of an ID of an application and another application of each user. In the embodiment, the registering section can receive correspondence information of an ID of APP1 and APP2 of a user.

The registering section can receive at least part of the correspondence information from the application server or the client computer. In one embodiment, a user of the client computer can first provide the application server with the correspondence information of the user, and the application server can provide the registering section with the correspondence information.

At S160, the registering section can generate ID mapping of the user based on the correspondence information received at S150. Thereby, the registering section can generate a mapping of IDs of users for the plurality of applications.

FIG. 6 shows a mapping table according to an embodiment of the present invention. In one embodiment, the registering section can generate an ID mapping such as the mapping table represented in FIG. 6. In one embodiment, the mapping table includes a federation master (FM) ID, and IDs for the plurality of applications. An FM ID is a user ID used in the federation server. According to the embodiment of FIG. 6, the mapping table includes the FM ID, the APP1 ID, the APP2 ID, the APP3 ID, etc.

In the embodiment of FIG. 6, a user allocated the FM ID of "1" has "miki" as the APP1 ID, "Miki_xx" as the APP2 ID, "0425" as the APP3 ID, and "miki@xx.com" as the APP4 ID. A user allocated the FM ID of "2" has "yuji" as the APP1 ID, "Yuji_yy" as the APP2 ID, "5217" as the APP3 ID, and "yuji@yy.com" as the APP4 ID. In the embodiment, the APP1 ID "miki" corresponds to the APP2 ID "Miki_xx", the APP3 ID "0425", and the APP4 ID "miki@xx.com." The registering section can store the ID mapping in the storing section of the federation server.

FIG. 7 shows a user table according to an embodiment of the present invention. The application server can store user information represented by the user table as shown in FIG. 7. In one embodiment, the application server can store IDs (e.g., log-in ID), passwords, e-mail addresses, and other attributes of a user for each user. In the embodiment, the application server (such as the application server 38) providing APP4 can store information of ID "Miki_xx", Password "********", E-mail "miki@xx.com" for a user. In the embodiment, the ID "Miki_xx" is stored as APP4 ID in the mapping table of FIG. 6.

As explained in relation to FIGS. 4-7, the federation server can configure ID federations with the plurality of application servers, and register the groups as well as the ID mapping used for SSO.

Figure 8:
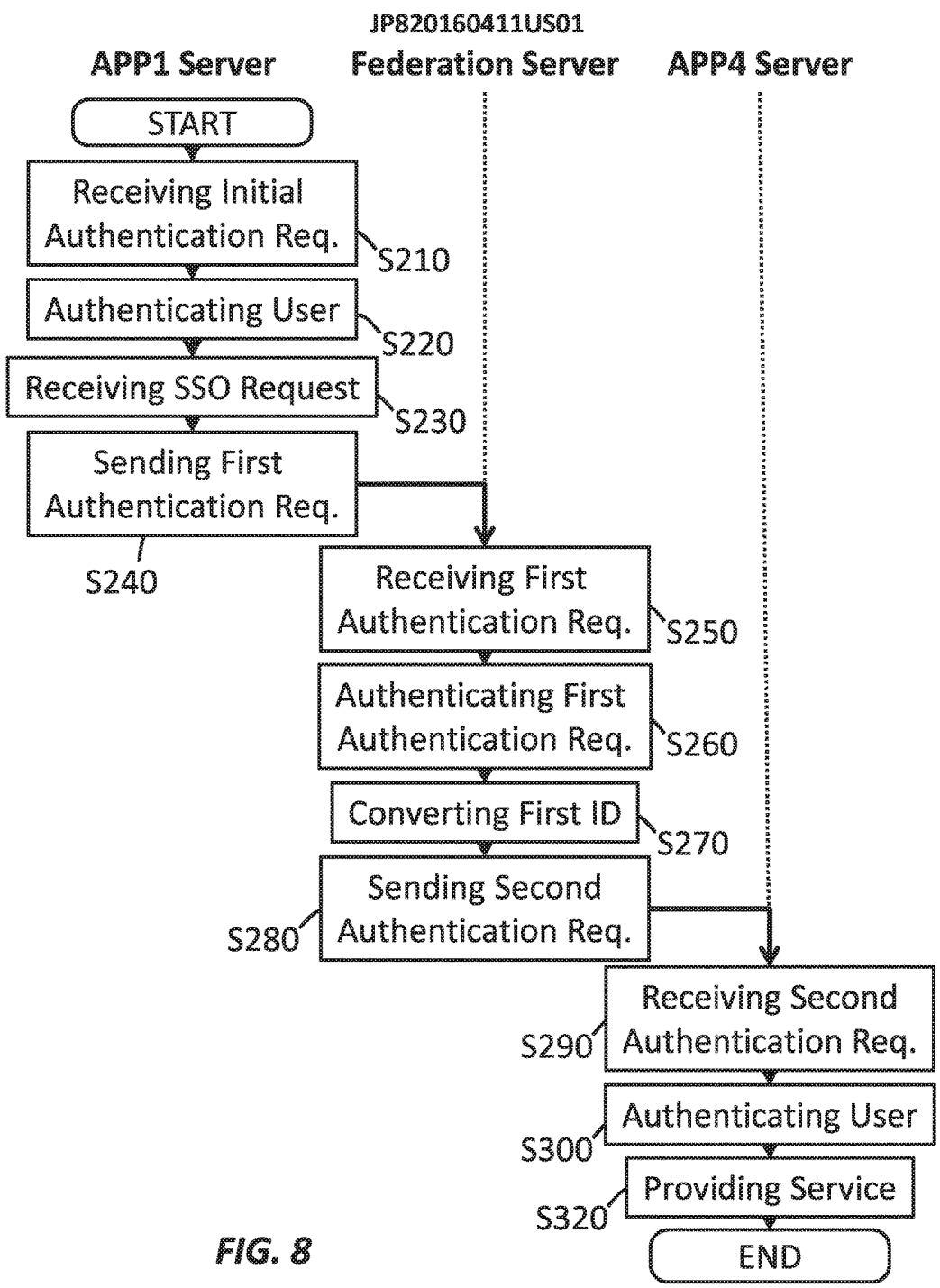
FIG. 8 shows a second operational flow according to an embodiment of the present invention.

FIG. 8 shows a second operational flow according to an embodiment of the present invention. The present embodiment describes an example in which a system, such as the system 10, performs the operations from S210 to S320, as shown in FIG. 8. The system can operate SSO based on ID federation by performing the operations of S210-S320. The system can perform the operations of FIG. 8 after configuring the ID federation and registering the ID mapping (e.g., after at least part of the operational flow of FIG. 4.).

At S210, an authenticating section in an application server, such as the authenticating section 220, can receive an initial authentication request of a target user from a client computer, such as the client computer 40, of the target user. In one embodiment, the authenticating section of the application server providing a first application (e.g., APP1) receives an initial authentication request of a target user including a first user ID and password of the target user.

At S220, the authenticating section can authenticate the target user. In one embodiment, the authenticating section can retrieve the target user in the user table such as shown in FIG. 7 by accessing a storing section, such as the storing section 210, and determine whether a pair of the first user ID and the password of the target user included in the initial authentication request exists in the user table of the first application.

If the authentication is successful, then the authenticating section can allow the target user to login to an application of the application server (such as APP1) and proceed with an operation of S230. In such case, the authenticating section can cause the application providing section to provide the client computer with the first application before an operation of S230 begins.

In one embodiment, if the authentication is not successful, then the authenticating section can send an error message to the client computer of the target user and the end the process of FIG. 8.

At S230, the authenticating section can receive an SSO request from the client computer of the target user. In one embodiment, the authenticating section can provide a website including an SSO request bottom or link having a target URL, and receive the SSO request in response to the target user accessing the target URL by clicking the bottom or the link.

For example, the authenticating section can provide a website of APP1 including an SSO request bottom showing a message "Sign-on APP4", the bottom including a URL to the federation server and a URL to a second application to which the target user wishes to login (e.g., APP4). For example, the bottom can include a target URL such as:

"https://app1.com/jct1/sps/fmtest1/sam20/logininital?RequestBinding=HTTPPost&PartnerId=https://FM.com/jct1/sps/fmtest1/saml20&NameIdFormat=Email&Target=https://FM.com/jct2/sps/fmtest2/saml20/logininitial?RequestBinding=HTTPPost&PartnerId=https://app4.com/jct2/sps/fmtest2/saml20&NameIdFormat=Email&Target=https://app4.com/ws2/sol2/hello.html" wherein "https://app1.com" corresponds to the application server providing APP1, "https://app4.com" corresponds to the application server providing APP4, and "https://FM.com" corresponds to the federation server.

At S240, the authenticating section can send a first authentication request for authenticating the target user to the federation server via the client computer of the target user. In one embodiment, the authenticating section can send the first authentication request using the bidirectional ID federation between the application server of the first application and the federation server. In another embodiment, the authenticating section can send the first authentication request using the first unidirectional ID federation from the application server of the first application to the federation server.

The first authenticating request can include at least information of the first user ID of the target user for the first application (e.g., APP1) and an identification of the second application (e.g., APP4).

In one embodiment, the first authenticating request can be implemented by a cookie and a URL. In the embodiment, the authenticating section can generate a redirect URL including a URL of the federation server further including the second application as a target of the second authentication request as a part of the first authenticating request.

For example, the authenticating section can extract the redirect URL from the target URL that the target user has clicked at S230, and send a redirect command to the client computer of the target user, for causing the client computer to access the redirect URL:

ticate (i) first user ID of the target user for the first application and/or (ii) the second application. In one embodiment, the converting section can determine whether the mapping table stored in the storing section includes the first ID of the target user for the first application included in the first authorization request. In the specific embodiment, the converting section can determine whether the first user ID "miki" is included in the APP1 ID of the mapping table, such as shown in FIG. 6.

In one embodiment, the converting section can determine whether the mapping table includes the second application. For example, the converting section can determine that the mapping table of FIG. 6 includes the second application "APP4." In the embodiment, the converting section can further determine whether the first application and the second application are in the same group. In the embodiment, the converting section can determine that APP1 and APP4 are in the same group having Group ID of "1," according to the group table of FIG. 5.

In one embodiment, if the authentication is successful, then the converting section can proceed with an operation of S270, and if not successful, then the converting section can "https://FM.com/jct1/sps/fmtest1/saml20&NameIdFormat=Email&Target=https://FM.com/jct2/sps/fmtest2/saml20/logininitial?RequestBinding=HTTPPost&PartnerId=https://app4.com/jct2/sps/fmtest2/saml20&NameIdFormat=Email&Target=https://app4.com/ws2/sol2/hello.html".

In one embodiment, the authenticating section can also send a cookie including a first user ID of the target user for the first application (e.g., APP1 ID "miki" of the target user) to the client computer as at least another part of the first authentication request. The cookie can be sent to the client computer as a token. In some embodiments, the authenticating section can provide the token in a form of a SAML (Security Assertion Markup Language) response.

Then, the client computer can access the federation server (e.g., https://FM.com) based on the redirect command, and provide the federation server with the token including the first user ID of the target user. In one embodiment, the client computer can provide the federation server with the token in the form of a SAML response. In one embodiment, the SAML response of the first authentication request can designate the first application (e.g., APP1) as an ID provider (IDP) and the federation server as a service provider (SP).

At S250, a receiving section such as the receiving section 140 can receive the first authentication request from the application server via the client computer. In one embodiment, the receiving section can receive the first authentication request for authenticating the target user using bidirectional ID federation. In another embodiment, the receiving section can receive the first authentication request for authenticating the target user using the first unidirectional ID federation.

In one embodiment, the receiving section can obtain at least a first user ID of the target user for the first application as at least a part of the first authentication request and the identification of the second application. For example, the receiving section can receive the first user ID "miki" of the target user for APP1 included in the SAML response, and "APP4" as the second application included in the redirect URL, from the client computer. The receiving section can provide a converting section such as the converting section 150 with the received first authentication request.

At S260, the converting section can authenticate the first authenticating request. The converting section can authentransmit an error message to the application server of the first application (e.g., APP1), and end the operation of FIG. 8.

At S270, the converting section can convert the first user ID of the first application to the second user ID of the second application based on the ID mapping of the mapping table. In one embodiment, the converting section can convert the first user ID to the second user ID corresponding to the first user ID in the mapping table stored in the storing section. For example, the converting section can convert the first user ID "miki" to the second user ID "miki@xx.com" based on the mapping table of FIG. 6. The converting section can provide a sending section, such as the sending section 160, with the second user ID.

In some embodiments, the converting section can convert the first user ID to the second user ID by predicting the second user ID from the first user ID based on an ID assignment rule of the second application. In one embodiment, the converting section can predict that the second user ID of the target user is the email address of the target user. In such embodiments, the receiving section can receive the email address of the target user as a part of the first authentication request at S250, and the converting section can convert the first user ID to the email address of the target user.

At S280, the sending section can send a second authentication request for requesting the second application to authenticate the target user, to the application server of the second application via the client computer. In one embodiment, the sending section can send the second authentication request using the bidirectional ID federation between the application server of the second application and the federation server. In another embodiment, the sending section may send the second authentication request using the second unidirectional ID federation from the federation server to the application server of the second application.

The second authenticating request can include at least information of the second user ID of the target user for the second application (e.g., APP4) and a URL of the second application. In one embodiment, the second authenticating request can be implemented by a cookie and a URL. In the embodiment, the sending section can generate a redirect URL including a URL of the second application as a part of the second authenticating request. The redirect URL included in the second authenticating request can be a part of the redirect URL of the first authenticating request.

For example, the sending section can extract the redirect URL of the second authenticating request from the redirect URL of the first authenticating request, and send a redirect command to the client computer of the target user, for causing the client computer to access the redirect URL:

"https://app4.com/jct2/sps/fmtest2/saml20&NameIdFormat=Email&Target=https://app4.com/ws2/sol2/hello.html".

In one embodiment, the sending section can also send a cookie including a second user ID of the target user for the second application (e.g., APP4 ID "miki@xx.com" of the target user) to the client computer as at least another part of the second authentication request. The cookie can be sent to the client computer as a token. In some embodiments, the authenticating section can provide the token in a form of a SAML (Security Assertion Markup Language) response.

Then, the client computer can access the application server of the second application (e.g., https://app4.com) based on the redirect command and provide the application server with the token. In one embodiment, the client computer can provide the application server with the token in the form of a SAML response. In one embodiment, the SAML response of the second authentication request can designate the federation server as an IDP and the second application as an SP.

As described, the converting section does not authenticate the first authentication request unless the first application and the second application are in the same group, in some embodiments. In such embodiments, the sending section can send the second authentication in response to the condition that the first application and the second application are in the group. In other embodiments, the sending section can confirm groups of the first application and the second application, instead of the converting section.

At S290, the application server of the second application can receive the second authentication request. In one embodiment, the authenticating section of the application server can receive the second authentication request.

At S300, the authenticating section of the application server of the second application can authenticate the target user based on the ID federation between the application server of the second application and the federation server. In one embodiment, the authenticating section of the application server of APP4 can authenticate the target user in response to determining that the second user ID in the second authentication request exists in the user table of the second application.

At S320, the application providing section can provide the client computer of the target user with the application service of the second application.

As explained below, in the embodiment of FIG. 8, the federation server receives the first authentication request from the application server of the first application based on the ID federation, converts the first user ID to the second user ID, and sends the second authentication request to the application server of the second application based on the ID federation.

According to some of the foregoing embodiments, the application servers and the federation servers can perform both as IDP and SP in a SAML authentication scheme, thereby enabling SSO. Specifically, the federation server can perform as SP in relation to the application server of one application server (e.g., the first application), and as IDP in relation to another application server (e.g., the application server of the second application).

According to some of the foregoing embodiments, the federation server can enable SSO by the ID federations with information of correspondences of IDs of users between a plurality of applications. Therefore, the federation server may not need to hold and manage a variety of information of users (e.g., pairs of ID and password of users for all the applications) such as the conventional IDP. This allows the federation server to require less computational resources compared to conventional IDP even as the number of web applications increases.

Figure 9:
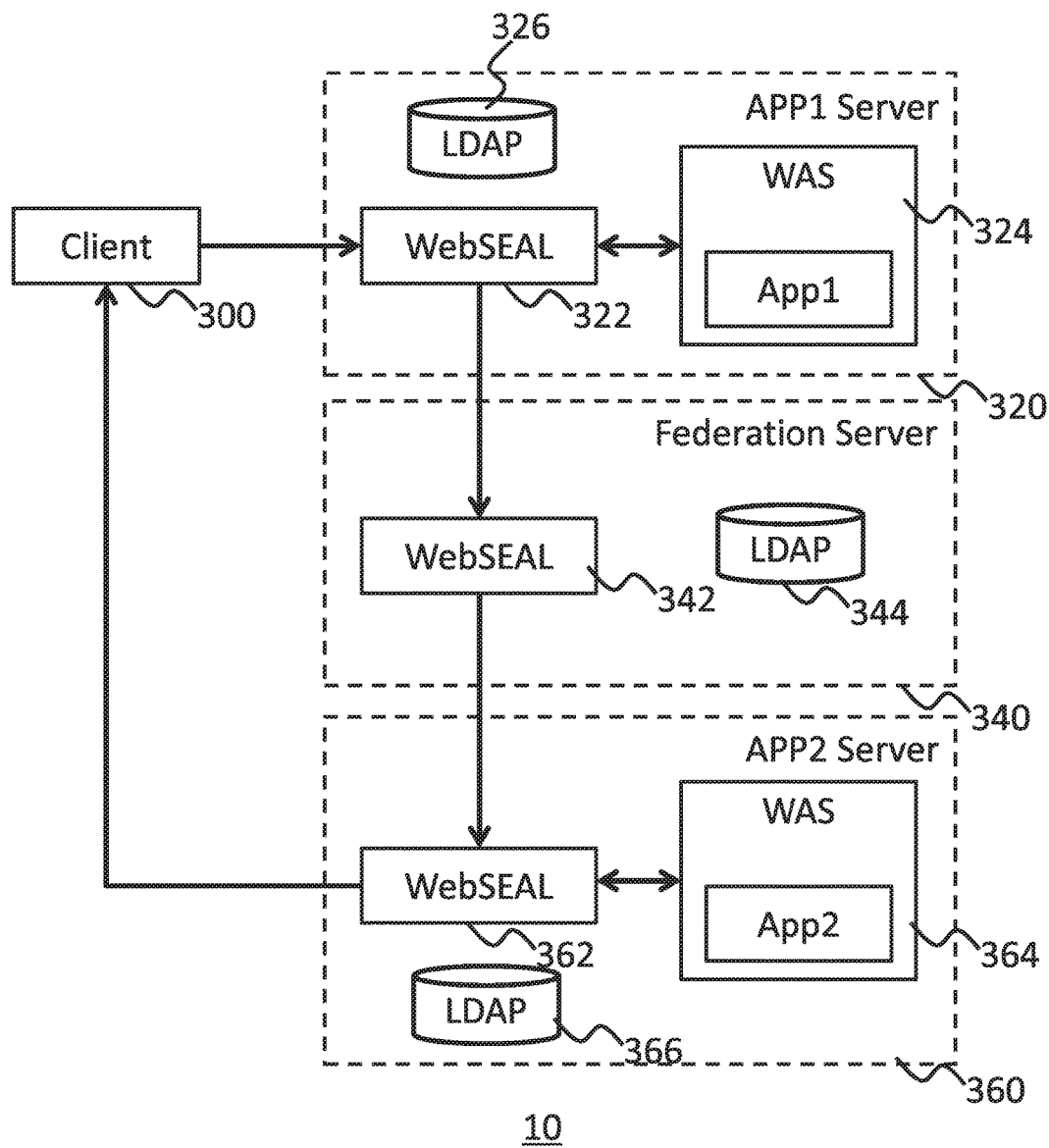
FIG. 9 shows an exemplary configuration of a system 10, according to a specific embodiment of the present invention.

FIG. 9 shows an exemplary configuration of a system 10, according to a specific embodiment of the present invention. In the embodiment, the system 10 comprises the application server 320, the federation server 340, and the application server 360. The federation server 340 can be implemented by the federation server 100 in FIG. 2 and the application servers 320, 360 can be implemented by the application server 200 in FIG. 3.

In one embodiment, the application server 320 can be implemented by a plurality of physical servers. In the embodiment of FIG. 9, the application server 320 comprises a WebSEAL 322, a Websphere Application Server (WAS) 324, and a Lightweight Directory Access Protocol (LDAP) directory server 326. WebSEAL is a webserver provided by IBM and performs as an authenticating section, such as the authenticating section 220 in FIG. 3. WAS is a webserver provided by IBM and performs as an application providing section, such as the application providing section 220 in FIG. 3.

LDAP directory server 326 is a database server provided by IBM and stores information based on LDAP. LDAP directory server 326 performs as a storing section, such as the storing section 210.

The application server 360 comprises a WebSEAL 362, a Websphere Application Server (WAS) 364, and a Lightweight Directory Access Protocol (LDAP) directory server 366, and can have the same configuration as the application server 320. The federation server 340 has WebSEAL 342, which has a configuring section, a registering section, a receiving section, a converting section, and a sending section, such as the configuring section 120, the registering section 130, the receiving section 140, the converting section 150, and the sending section 160. The federation server 340 also has an LDAP directory server 344, which performs as a storing section, such as the storing section 110.

While FIGS. 1-9 may mainly describe embodiments where the system, such as the system 10, performs SSO by a single user, FIGS. 10-16 can relate to embodiments where the system performs ID gateway functions among a plurality of users. In the embodiments relating to FIGS. 10-16, commonly named elements can have the same or similar function as the corresponding elements explained in relation to FIGS. 1-9, and only the differences from the embodiments relating to FIGS. 1-9 can be explained below.

Figure 10:
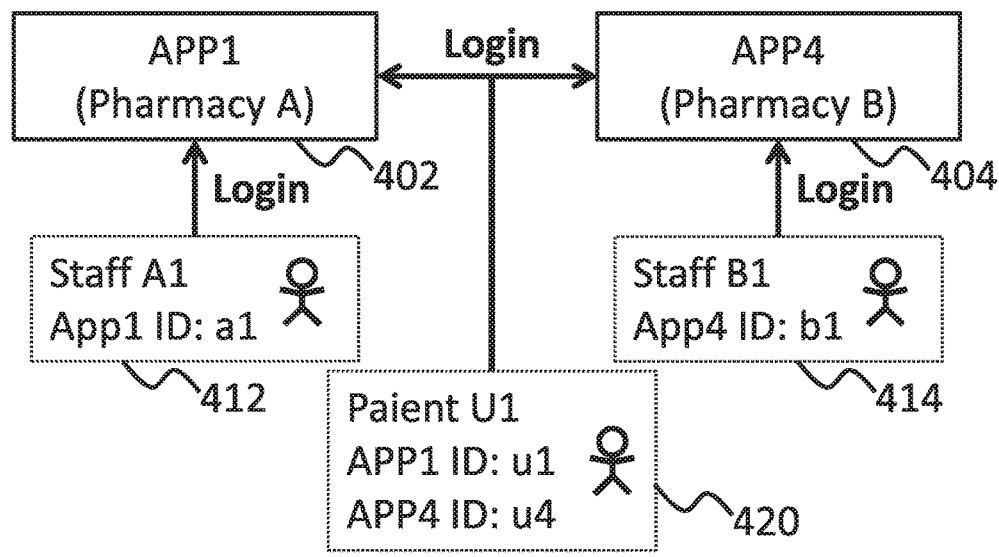
FIG. 10 shows applications and users according to an embodiment of the present invention.

FIG. 10 shows applications and users according to an embodiment of the present invention. In the embodiment of FIG. 10, a system can provide at least two applications ("APP1" indicated as 402 in FIG. 10 and "APP4" indicated as 404), where APP1 is provided by Pharmacy A and APP4 is provided by Pharmacy B. The applications can store information of medication records of a plurality of patients. For example, APP1 can store medication records of users of Pharmacy A.

In the embodiment, Staff A1, indicated as 412, who is a pharmacist hired by Pharmacy A, can login to APP1 with ID: a1 at a store of Pharmacy A, and Staff B1, indicated as 414, who is a pharmacist hired by Pharmacy B, can login to APP4 with ID: b1 at a store of Pharmacy B. U1, indicated as 420, can be a patient, who receives medication at both of Pharmacy A and Pharmacy B.

In an embodiment, Staff A1 can login to APP1 as a manager or an administrator who has authority to read and/or write information of patients that are taken care of by Staff A1 or all staff of Pharmacy A. Staff B1 can login to APP4 as a manager or an administrator who has authority to read and/or write information of patients that are taken care of by Staff B1 or all staff of Pharmacy B.

U1 can login to APP1 with ID:u1 and APP4 with ID:u4 as a user who has an authority to read and/or write information of only oneself. When U1 visits a store of Pharmacy A, A1 can review medication records of U1 only at Pharmacy A. However U1 can wish to disclose his/her medication records made at Pharmacy B too, to A1 at the store of Pharmacy A. In such situations, systems explained in relation to FIGS. 11-16 can enable A1 to access the medication records of U1 made at Pharmacy B.

Figure 11:
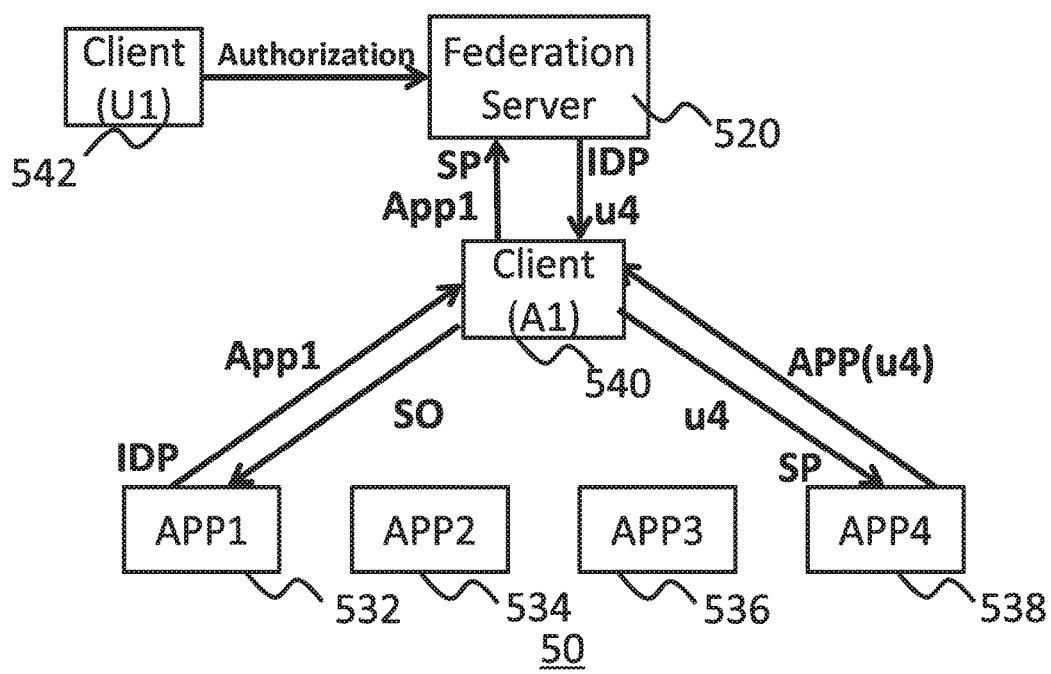
FIG. 11 shows an exemplary configuration of a system 50, according to an embodiment of the present invention.

FIG. 11 shows an exemplary configuration of a system 50, according to an embodiment of the present invention. In the embodiment of FIG. 11, the system 50 includes an application server 532, an application server 534, an application server 536, an application server 538, a client computer 540, and a client computer 542. The application servers 532, 534, 536, 538 provide application services APP1, APP2, APP3, and APP4, respectively.

According to some embodiments of the present invention, the federation server 520 and the application servers 532-538 can perform SSO by operating as both an ID Provider (IDP) and a Service Provider (SP) in the same or similar manner explained in relation to the system 10 in FIG. 1.

In some embodiments, the system 50 can perform the same functions as the system 10 described in FIG. 1. In these embodiments, the federation server 520, the application servers 532, 534, 536, 538, and the client computers 540/542 can correspond to the federation server 20, the application servers 32, 34, 36, 38, and the client computer 40. The application servers 32, 34, 36, 38 can be implemented by the application server 200 shown in FIG. 3.

In an embodiment, the federation server 520 and each of the application servers 532-538 can collectively form an ID federation for providing ID information. In the embodiment, the client computer 542, which is used by U1, can login two or more of APP1-APP4 (e.g., APP1 and APP4) by SSO. In such embodiment, the client computer 542 can correspond to the client computer 40 in FIG. 1. In the embodiment, the client computer 540, which is used by A1, may not login to the two or more of APP1-APP4 by SSO.

In the embodiment of FIG. 11, the system 50 can also perform ID gateway functions for a plurality of users. In an embodiment, ID gateway functions can provide conversion of a user ID of one user into another user ID of another user. In an embodiment, the system 50 can enable one user of an application to access information of another user on the same or different application under a predetermined condition.

In an embodiment, a first user (e.g., Staff A1 of Pharmacy A) signs-on (SO) to APP1 on the client computer 540. Then, the application server 532 can act as the IDP to provide the federation server 520 with the first user ID (shown as "App1") of the first user via the client computer 540. The federation server 520 can act as the SP to receive the the first user ID (e.g., App1) from the IDP, and then can convert the first user ID (e.g., App1) of the first user to a second user ID (shown as "u4") of the second user (e.g., U1) used for APP4.

The federation server 520 can then act as the IDP to provide the application server 538 with the second user ID (e.g., u4), which is associated with the second user (e.g., U1), via the client computer 540. The application server 538 can act as the SP to receive the second user ID (e.g., u4) of the second user (e.g., U1) and to provide the client computer 540 of the first user (e.g., A1) with application service (shown as "APP(u4)") of APP4 for the second user (e.g., U1) of the second user ID (e.g., u4).

In an embodiment, the application server 538 can retrieve and provide information of the second user (e.g., U1) to the client computer 540, by using the second user ID (e.g., u4). Thereby, the first user (e.g., A1) can receive application service of APP4 as the second user (e.g., U1), and access information of the second user.

In an embodiment, the federation server 520 can perform the conversion of the first user ID (e.g., App1) into the second user ID (e.g., u4), only when the second user (e.g., U1) gives authorization to the first user (e.g., A1). In the embodiment, the federation server 520 can confirm whether authorization has been given by referring to condition information.

Figure 12:
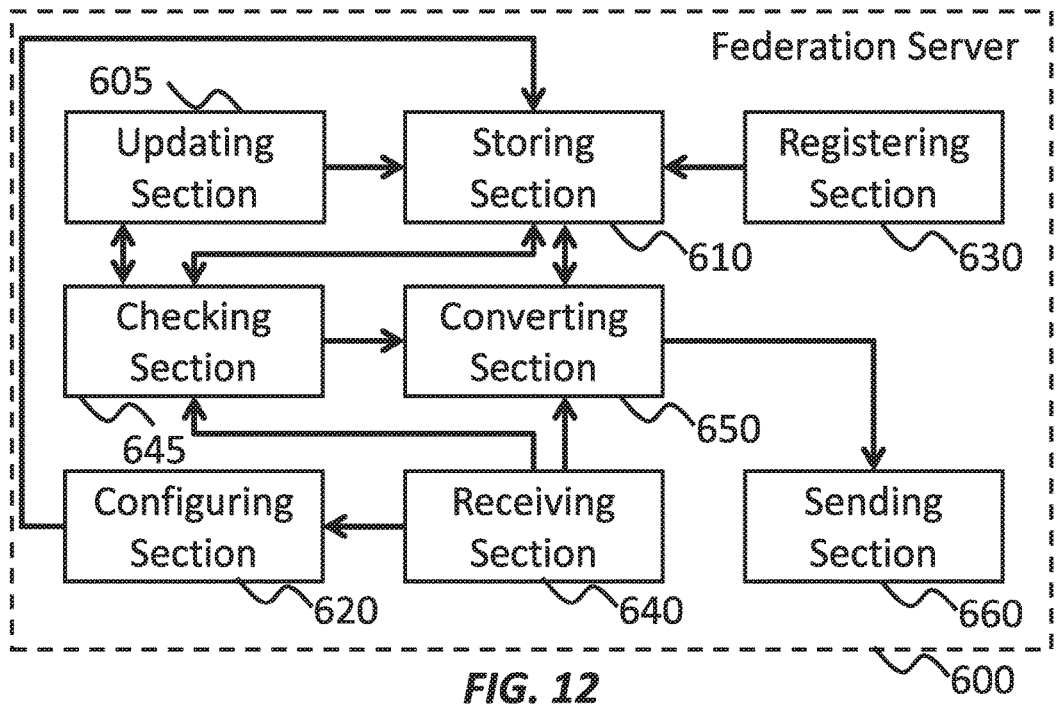
FIG. 12 an exemplary configuration of a federation server 600, according to an embodiment of the present invention.

FIG. 12 shows an exemplary configuration of a federation server 600, according to an embodiment of the present invention. The federation server 520 in FIG. 11 can be implemented by the federation server 600.

The federation server 600 can be an apparatus comprising a processor or programmable circuitry and one or more computer readable mediums collectively including instructions embedded therewith. The instructions, when executed by the processor, can cause the processor or the programmable circuitry of the federation server 600 to operate as a plurality of operating sections. Thereby, the federation server 600 can be regarded as comprising: an updating section 605, a storing section 610, a configuring section 620, a registering section 630, a receiving section 640, a checking section 645, a converting section 650, and a sending section 660. A computer program product including one or more computer readable storage mediums collectively storing the program instructions can also be provided.

The federation server 600 can have the same or similar elements with the federation servers explained in relation to FIGS. 1-9. In an embodiment, the storing section 610, the configuring section 620, the registering section 630, the receiving section 640, the converting section 650, and the sending section 660 can have the same or similar configuration and/or function with the storing section 110, the configuring section 120, the registering section 130, the receiving section 140, the converting section 150, and the sending section 160, respectively, of the federation server 100 in FIG. 2.

The updating section 605 can receive an authorization of the second user and update the condition information to reflect the authorization of the second user. In an embodiment, the updating section 605 can access the condition information stored in the storing section 610 and update the condition information in the storing section 610.

The storing section 610 can further store the condition information.

The receiving section 640 can receive a first authentication request for authenticating a first user who has been authenticated on a first application among the plurality of applications with a first user ID using an ID federation between the first application and the federation server from among the plurality of ID federations, from the client computer of the first user.

In an embodiment, the first authentication request can include the first user ID and an identification of the second application (e.g., APP4), to which the first user wishes to access. In an embodiment, the first user ID can include or represent a user ID (e.g., a1) of a first user (such as "A1" in FIG. 10), or, an identification (e.g., App1) of the first application (e.g., APP1). In an embodiment, the first user has been authenticated on the first application before the receiving section receives the first authentication request from the client computer of the first user.

The checking section 645 can check the first user ID to determine whether the first user is authorized to access information of a second user on a second application among the plurality of applications. In an embodiment, the checking section 645 can access the condition information stored in the storing section 610, and determine whether the condition information indicates that the first user (e.g., A1) of the first application (e.g., APP1) is authorized to access information of the second user (e.g., U1) on the second application (e.g., APP4).

The converting section 650 can convert the first user ID indicated in the first authentication request to the second user ID of the second application based on the checking by the checking section 645. In one embodiment, the converting section 650 can receive a result of checking from the checking section 645, and if the result is affirmative, convert the first user ID (e.g., App1), to the second user ID of the second user for the second application (e.g., u4). The converting section 650 can provide the sending section 660 with the second user ID directly or via the storing section 610.

The sending section 660 can send a second authentication request to a second application (e.g., APP4) among the plurality of applications for authenticating the first user using an ID federation between the federation server 600 and the second application from among the plurality of ID federations. Thereby, the sending section 660 can send the second authentication request in response to the checking section 645 determining that the first user is authorized to access information of the second user ID.

Figure 13A:
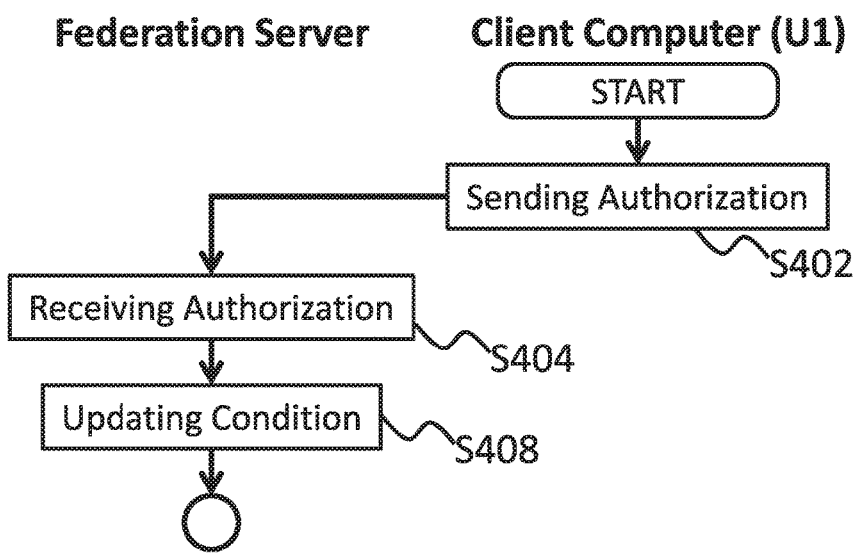
FIG. 13A shows a third operational flow according to an embodiment of the present invention.
Figure 13B:
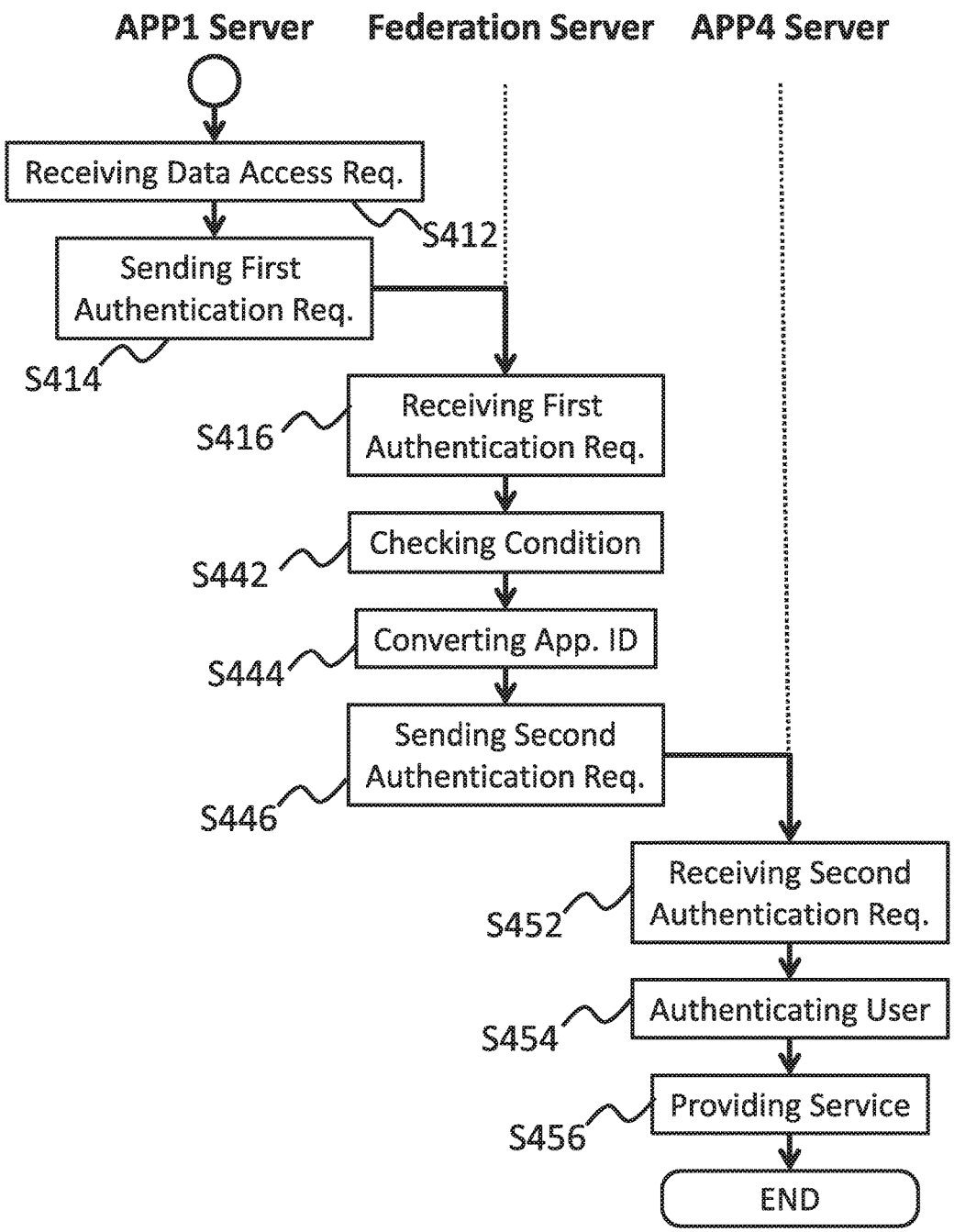
FIG. 13B shows a third operational flow according to an embodiment of the present invention.
Figure 13C:
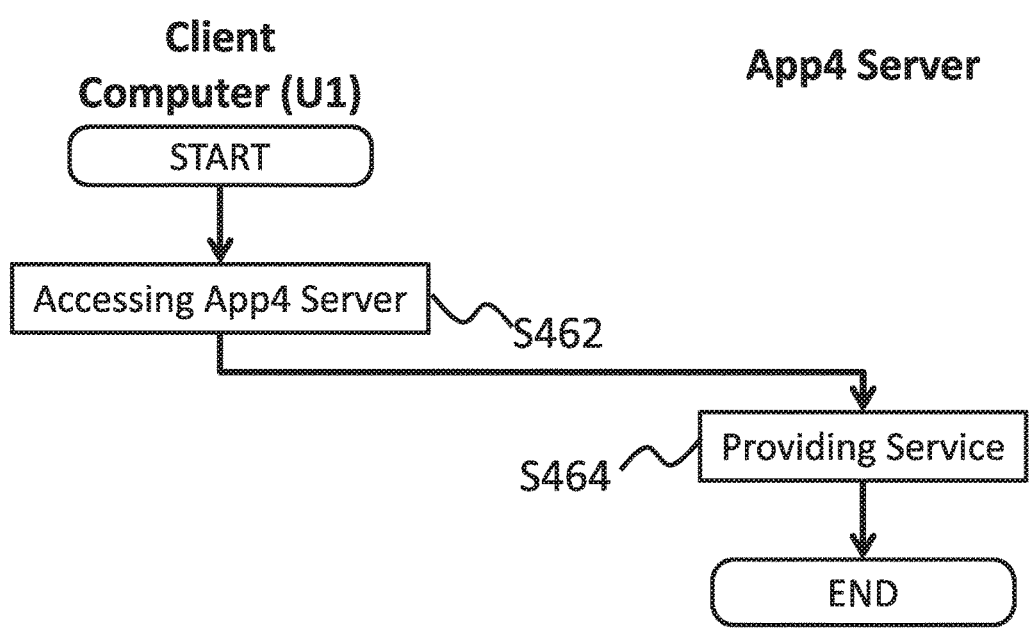
FIG. 13C shows a third operational flow according to an embodiment of the present invention.

FIGS. 13A-C shows third operational flows according to an embodiment of the present invention. FIGS. 13A-C can be collectively referred to as FIG. 13. In an embodiment, the third operational flows are performed in an order of FIG. 13A, FIG. 13B, and FIG. 13C. The third operational flows can be performed in other orders. In embodiments of FIG. 13, a system, such as the system 50, can obtain an authorization of the second user prior to the conversion of IDs.

FIG. 13A shows an example in which a federation server, such as the federation server 520/600, and a client computer of a second user perform the operations from S402 to S408. The federation server can record an authorization of the second user upon performance of the operations of S402-S408. The operations of FIG. 13A can be performed before the federation server can utilize the ID federations, as further explained below in FIG. 13B.

At S402, a client computer (e.g., the client computer 542) of a second user (e.g., U1) can send an authorization to a federation server such as the federation server 600. In an embodiment, the authorization sent by the client computer can include a condition under which the information of the second user is allowed. In the embodiment, the authorization can include information of a requester that requires access to information of the second user, a data holder that has information of the second user, and the second user ID.

In a specific embodiment, the authorization can include (i) the first user ID (e.g., App1 or a1), (ii) an identification of a second application (e.g., "App4" which is an ID representing APP4), and (iii) the second user ID (e.g., u4) of the second user for the second application.

In an embodiment, the authorization may not include (ii) the identification of a second application. In such embodiment, all applications (e.g., APP1, . . . , APP4) can be designated as the second application by the federation server.

In an embodiment, the authorization can further include an access range. In an embodiment, the access range can include at least one of a time when the information of the second user ID is recorded on the second application, and a record of the information of the second user ID on the second application. By including the access range in the authorization, the second user can limit information accessed by the first user within the access range. For example, the second user can allow the first user to access its medication records of Pharmacy B of on March, 2017.

At S404, an updating section such as the updating section 605 of the federation server 600 can receive the authorization of the second user from the client computer of the second user.

At S408, the updating section can update the condition information to reflect the authorization of the second user. In an embodiment, the updating section can access the condition information stored in a storing section such as the storing section 610, and add information of the authorization received from the client computer to the condition information. An example of the condition information is explained in relation to FIG. 16.

FIG. 13B shows an example in which a federation server, such as the federation server 520/600, and application servers, such as the application servers 532 and 538, perform the operations from S412 to S456. The federation server can convert a first user ID of the first user to a second user ID of the second user by performing these operations. The operations of FIG. 13A can be performed before performance of the operations of FIG. 13B.

At S412, an authenticating section, such as the authenticating section 220 of the application server 200, for a first application (e.g., APP1) can receive a data access request from a client computer (e.g., 540) of a first user (e.g., A1). In one embodiment, the authenticating section can provide a website including a data access request bottom or link having a target URL, and receive the data access request in response to the first user accessing the target URL by clicking the bottom or the link.

For example, the authenticating section can provide a website of APP1 including an data access request bottom showing a message "Data Access U1 on APP4", the bottom including a URL to the federation server and a URL to a second application to which the first user wishes to access (e.g., APP4). For example, the bottom can include a target URL such as:

"https://app1.com/jct1/sps/fm1/saml20/logininitial?RequestBinding=HTTPPost&PartnerId=https://FM.com/jct1/sps/fm1/saml20&NameIdFormat=Email&Target=https://FM.com/jct2/sps/fm2/saml20/logininitial?RequestBinding=HTTPPost&PartnerId=https://app4.com/jct2/sps/fm2/saml20&NameIdFormat=Email&Target=https://app4.com/app/hello.html?uid=u4", wherein "https://app1.com" corresponds to the application server providing APP1, "https://app4.com" corresponds to the application server providing APP4, and "https://FM.com" corresponds to the federation server. In the URL, the first user ID can correspond to "app1" or "app1.com", and the second user ID can corresponid to "u4" in "uid=u4".

In an embodiment, before starting an operation of S412, the client computer of the first user can login to the first application (e.g., APP1) by performing operations similar to S210-S220 in FIG. 8 with the application server of the first application (e.g., APP1).

At 414, the authenticating section can send a first authentication request for authenticating the first user to the federation server via the client computer of the first user. In one embodiment, the authenticating section can send the first authentication request using the bidirectional ID federation between the application server of the first application and the federation server. In another embodiment, the authenticating section can send the first authentication request using the first unidirectional ID federation from the application server of the first application to the federation server.

The first authenticating request can include at least information of the first user ID, an identification of the second application, and an identification of a second user on the second application. In an embodiment, the first user ID can include or be identical to the application ID (such as "App1" in FIG. 11) representing the first application (e.g., APP1). In an embodiment, the first user ID can include or be identical to the ID (such as "a1" in FIG. 10) representing a first user (such as "A1" in FIG. 10). In an embodiment, the identification of the second application can include the Application ID of the second application (e.g., APP4). In an embodiment, the identification of a second user on the second application can include the ID (e.g., u4) of the second user (e.g., U1) on the second application.

In one embodiment, the first authenticating request can be implemented by a cookie and a URL. In the embodiment, the authenticating section can generate a redirect URL including a URL of the federation server further including the second application as a target of the second authentication request as a part of the first authenticating request.

For example, the authenticating section can extract the redirect URL from the target URL that the first user has clicked at S412, and send a redirect command to the client computer of the first user, for causing the client computer (e.g., the client computer 540) of the first user (e.g., A1) to access the redirect URL:

first user ID. In one embodiment, the client computer can provide the federation server with the token in the form of a SAML response. In one embodiment, the SAML response of the first authentication request can designate the first application (e.g., APP1) as an ID provider (IDP) and the federation server as a service provider (SP).

In the embodiments above, the first application and the second application are different. But in some embodiments, the first application and the second application can be the same.

At S416, a receiving section, such as the receiving section 640, can receive the first authentication request from the application server via the client computer. In one embodiment, the receiving section can perform the operation of S416 in the same or similar manner as the operation of S250. In an embodiment, the receiving section can obtain the first user ID (e.g., App1), the identification of the second application (e.g., App4), and the second user ID (e.g., u4) with the first authentication request in the SAML response from the client computer. The receiving section can provide a checking section and a converting section, such as the checking section 645 and the converting section 650, with the received first authentication request.

At S442, the checking section can check the first user ID to determine whether the first user is authorized to access information of the second user on the second application. In an embodiment, the checking section can access the storing section and obtain the condition information from the storing section.

The checking section can determine whether the condition information indicates that the first user is authorized to access information of the second user on the second application. In an embodiment, the checking section can check whether the first user ID, the second application, and the second user ID in the first authentication request satisfy the condition defined in the condition information.

In one embodiment, if the checking by the checking section is affirmative, then the converting section can proceed with an operation of S444, and if not affirmative, then the converting section can transmit an error message to the "https://FM.com/jct1/sps/fm1/saml20&NameIdFormat=Email&Target=https://FM.com/jct2/sps/fm2/saml20/logininitial?RequestBinding=HTTPPost&PartnerId=https://app4.com/jct2/sps/fm2/saml20&NameIdFormat=Email&Target=https://app4.com/app/hello.html?uid=u4".

In one embodiment, the authenticating section can also send a cookie including a first user ID (e.g., App1) to the client computer as at least another part of the first authentication request. The cookie can be sent to the client computer as a token. In some embodiments, the authenticating section can provide the token in the form of a SAML (Security Assertion Markup Language) response.

Then, the client computer can access the federation server (e.g., https://FM.com) based on the redirect command, and provide the federation server with the token including the application server of the first application (e.g., APP1), and end the operation of FIG. 13B.

At S444, the converting section can convert the first user ID to the second user ID based on the condition information used at S442. In one embodiment, the converting section can convert the first user ID to the second user ID corresponding to the first user ID in the condition information stored in the storing section. For example, the converting section can convert the first user ID "App1" to the second user ID "u4".

The converting section can provide a sending section, such as the sending section 660, with the second user ID.

In the embodiments above, the converting section can perform the conversion of IDs among applications in the same group. In other embodiments, the converting section can perform the conversion of IDs among applications not in the same group.

At S446, the sending section can send a second authentication request for requesting the second application to authenticate the first user with the second user ID, to the application server of the second application via the client computer. In one embodiment, the sending section can send the second authentication request using the bidirectional ID federation between the application server of the second application and the federation server. In another embodiment, the sending section can send the second authentication request using the second unidirectional ID federation from the federation server to the application server of the second application.

The second authenticating request can include at least information of the second user ID (e.g., u4) for the second application (e.g., APP4) and a URL of the second application. In one embodiment, the second authenticating request can be implemented by a cookie and a URL. In the embodiment, the sending section can generate a redirect URL including a URL of the second application as a part of the second authenticating request. The redirect URL included in the second authenticating request can be a part of the redirect URL of the first authenticating request.

For example, the sending section can extract the redirect URL of the second authenticating request from the redirect URL of the first authenticating request, and send a redirect command to the client computer of the first user, for causing the client computer (e.g., the client computer 540) of the first user (e.g., A1) to access the redirect URL:

"https://app4.com/jct2/sps/fm2/saml20&NameIdFormat=Email&Target=https://app4.com/app/hello.html?uid=u4".

40

In one embodiment, the sending section can also send a cookie including a second user ID of the second user for the second application (e.g., APP4 ID "u4" of the second user "U1") to the client computer as at least another part of the second authentication request. The cookie can be sent to the client computer as a token. In some embodiments, the authenticating section can provide the token in a form of the SAML response.

Then, the client computer of the first user can access the application server of the second application (e.g., https://app4.com) based on the redirect command and provide the application server with the token. In one embodiment, the client computer can provide the application server with the token in the form of a SAML response. In one embodiment, the SAML response of the second authentication request can designate the federation server as an IDP and the second application as an SP.

In an embodiment, the sending section can include at least some of the condition in the condition information used at S442 in the second authentication request. In the embodiment, the sending section can include the access range in the second authentication request.

In an embodiment, the sending section can send authority information of the first user ID with the second authentication request. In an embodiment, the authority information can include "writable" and "readable."

At S452, the application server of the second application can receive the second authentication request. In one embodiment, the authenticating section (e.g., the authenticating section 220) of the second application server (e.g., the application server 538 in FIG. 11) can receive the second authentication request.

At S454, the authenticating section of the application server of the second application can authenticate the first user with the second user ID based on the ID federation between the application server of the second application and the federation server. In one embodiment, the authenticating section of the application server of APP4 can authenticate the first user in response to determining that the second user ID (e.g., u4) in the second authentication request exists in the user table of the second application.

The authenticating section can further send a notification to the client computer (e.g., the client computer 542) of the second user (e.g., U1) in response to receiving the second authentication request from the federation server. Thereby, since the second user can be notified that the first user accesses the second user's information, unauthorized access can be soon prevented if happens.

At S456, the application providing section (e.g., the application providing section 230) of the second application server (e.g., the application server 538 in FIG. 11) can provide the client computer (e.g., the client computer 540) of the first user (e.g., A1) with the application service of the second application (e.g., APP4).

In an embodiment, the application providing section can provide the client computer with information of the second user (e.g., medication record of U1) on APP4. Thereby, a first user (e.g., A1) of the first application (e.g., APP1) can access the information of another user (e.g., U1) on the different or the same application (e.g., APP4).

In an embodiment, the application providing section can provide the information of the second user within the access range included in the second authorization request. Thereby, the first user cannot access information of the second user that is out of the access range on the second application.

In an embodiment, the client computer of the first user can only access the information of the second user in a manner specified by the authority information in the second authorization request. For example, if the authority information includes only "readable", then the application server of the second application (e.g., APP4) can authorize reading of the information of the second user on the second application, and prohibit writing of the information of the second user on the second application in response to receiving the second authentication request including the authority information of "readable." In such an embodiment, the client computer of the first user can only read the information of the second user, but cannot write the information of the second user on the second application.

FIG. 13C shows an example in which a client computer, such as the client computer 540, and an application server, such as the application servers 538, perform the operations from S462 to S464. The client computer can utilize the second application without the authentication by the operations of FIG. 13C. The operations of FIG. 13B can be performed before performance of the operations of FIG. 13C.

At S462, a client computer (e.g., the client computer 540) of the first user (e.g., A1) can access an application server (e.g., the application server 538) of a second application (e.g., APP4). In an embodiment, the client computer can access a website having a target URL: "https://app4.com/app/hello.html?uid=u1"

At S464, an application providing section, such as the application providing section 230, of the application server of the second application can provide the client computer of the first user with the second application. The application providing section can provide the client computer with the application service in the same or similar manner with the embodiments explained for S456. Thereby, the client computer of the first user can directly access the second application once authenticated by the operations of FIG. 13B.

Figure 14:
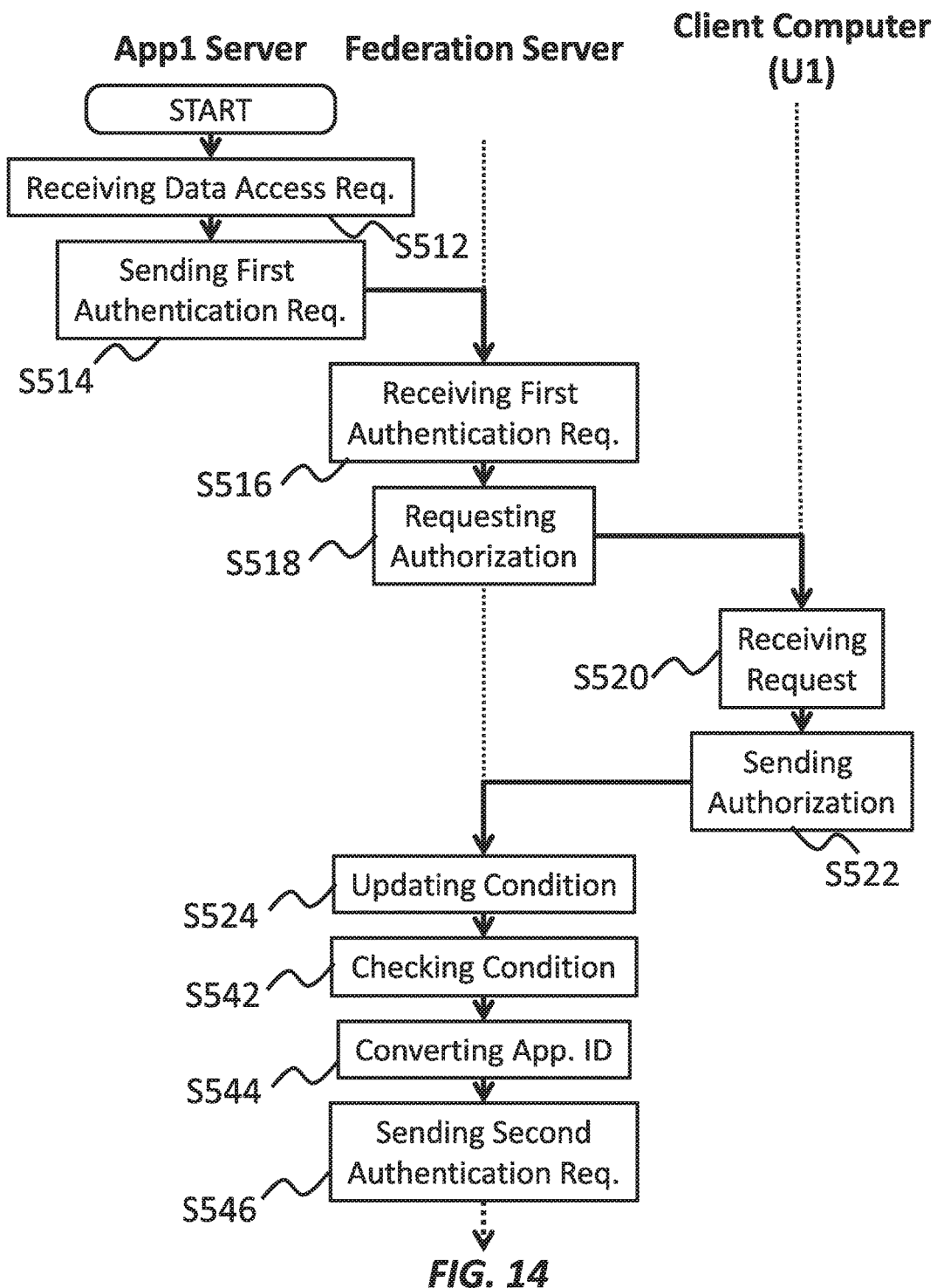
FIG. 14 shows a fourth operational flow according to an embodiment of the present invention.

FIG. 14 shows a fourth operational flow according to an embodiment of the present invention. FIG. 14 describes an example in which a system, such as the system 50, performs at least operations from S512 to S546. In embodiments of FIG. 14, the system can obtain an authorization of the second user on demand with the federation server and the client computer of the second user.

The system can perform operations of S512, S514, and S516 in the same or similar manner with embodiments explained in relation to S412, S414, and S416 in FIG. 13B.

At S518, a federation server, such as the federation server 600, can send a request for an authorization relating to the first authorization request, to a client computer (e.g., the client computer 542) of the second user (e.g., U1). In an embodiment, the federation server can send a request for the second user (e.g., U1) to authorize the first user (e.g., A1) to access information of the second user on the second application. In an embodiment, the request can include the first user ID (e.g., "App1" or "A1"), and an identification of the second application (e.g., App4).

At S520, the client computer of the second user can receive the request for the authorization.

At S522, the client computer of the second user can send an authorization to the federation server in response to the second user inputting the authorization. The client computer can perform the operation of S522 in the same or similar manner with the operation of S402.

At S524, the federation server can receive the authorization from the client computer, and update the condition information. The federation server can perform the operation of S524 in the same or similar manner with the operations of S404 and S408.

The federation server can perform operations of S542, S544, and S546 in the same or similar manner with embodiments explained in relation to S442, S444, and S446. In addition, the application server of the second application (e.g., APP4) can perform the operations as the same or similar to the operations of S452, . . . , S456. In an embodiment, the federation server may not update the condition information at S524 and perform the operation of S542 directly using the authorization received from the client computer at S524.

According to the embodiments explained in relation to FIG. 14, the system can confirm whether the second user (e.g., U1) allows the first user (e.g., A1) to access information of the second user, after the application server of the first application (APP1) receives the data access request.

For example, the second user (e.g., U1) can visit a store of Pharmacy A, and wish to disclose his/her medication records made at Pharmacy B to the first user (e.g., A1, a staff of Pharmacy A) at the store. In such a case, the second user can ask by sending the request of authorization of the first user, and the client computer of the first user sends such request to the federation server via the application server of the first application. Then, the federation server can receive the authorization from the second user, and accordingly convert the first user ID to the second user ID for allowing the first user to access information of the second user on the second application.

Figure 15:
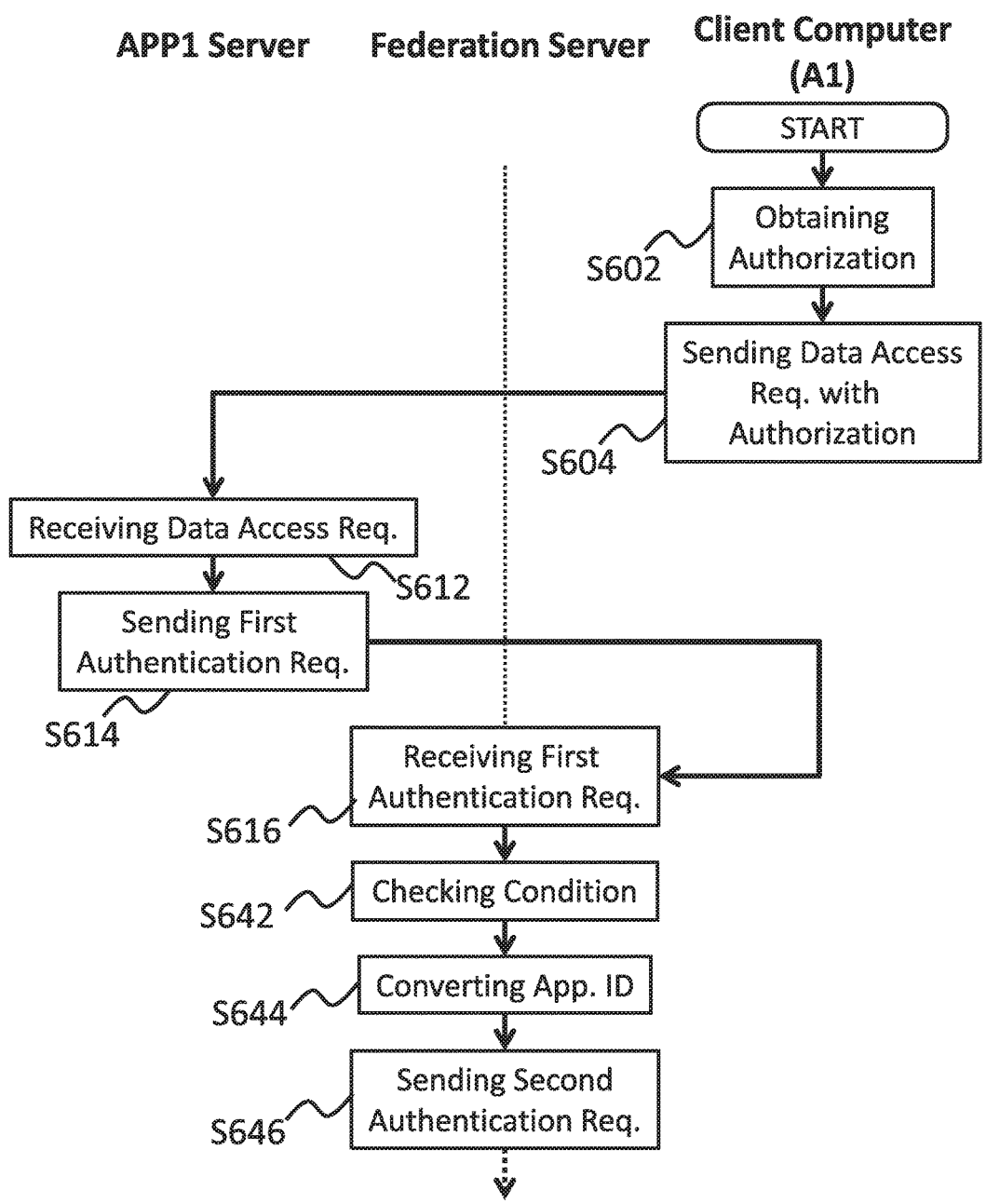
FIG. 15 shows a fifth operational flow according to an embodiment of the present invention.

FIG. 15 shows a fifth operational flow according to an embodiment of the present invention. FIG. 15 describes an example in which a system, such as the system 50, performs at least operations from S602 to S646. In embodiments of FIG. 15, the system can obtain an authorization of the second user on demand with the application server and the client computer of the first user. Before starting S602, the client computer of the first user (e.g., A1) can login to the first application (e.g., APP1) by performing operations similar to S210-S220 in FIG. 8 with the application server of the first application.

At S602, a client computer, such as the client computer 540, of the first user (e.g. A1) can obtain authorization of the second user. In an embodiment, the second user (e.g., U1) can directly input the authorization to the client computer of the first user, such as by clicking an authorization bottom appearing on a display of the client computer of the first user.

In an embodiment, the client computer can also input a second user password corresponding to the second user ID (e.g., u4) by the second user in order to verify the authorization by the second user. In the embodiment, the client computer can previously provide and store the second user password in a storing section, such as the storing section 610, of the federation server 600.

At S604, the client computer of the first user can send a data access request to the application server of the first application. In an embodiment, the client computer can send the data access request explained for S412 to the application server. In an embodiment, the client computer can send the authorization of the second user with the data access request. In an embodiment, the authorization of the second user can include the second user password.

At S612, an authenticating section, such as the authenticating section 220 of the application server 200, for the first application (e.g., APP1) can receive the data access request from the client computer of the first user (e.g., A1). In an embodiment, the authenticating section can perform S612 in the same or similar manner with S412. In an embodiment, the authenticating section can receive the authorization of the second user with the data access request.

At S614, the authenticating section can send a first authentication request for authenticating the first user to the federation server via the client computer of the first user (e.g., A1). In an embodiment, the authenticating section can perform S614 in the same or similar manner with S414. In an embodiment, the authenticating section can send the authorization of the second user with the first authentication request.

At S616, a receiving section, such as the receiving section 640, can receive the first authentication request from the application server of the first application via the client computer. In an embodiment, the receiving section can perform S616 in the same or similar manner with S416. In an embodiment, the receiving section can receive the authorization of the second user from the application server of the first application.

At S642, a checking section such as the checking section 645 can check the first user ID to determine whether the first user is authorized to access information of a second user on the second application. In an embodiment, the checking section can perform checking based on the authorization of the second user.

In an embodiment, the checking section can determine whether the authorization of the second user indicates that the first user is authorized to access information of the second user on the second application. In an embodiment, the checking section can check whether the first user ID, the second application, and the second user ID of the first authentication request satisfy the authentication of the second user.

In an embodiment, the checking section can further check the second user password. In the embodiment, the checking section can further check whether the second user password received with the first authentication request is the same as the second user password that is previously stored in the storing section.

In one embodiment, if the checking by the checking section is affirmative, then the converting section can proceed with an operation of S644, and if not affirmative, then the converting section can transmit an error message to the application server of the first application (e.g., APP1) and/or the client computer of the first user (e.g., A1), and end the operation of FIG. 15.

The federation server can perform operations of S644 and S646 in the same or similar manner with embodiments explained in relation to S644 and S646. In addition, the application server of the second application (e.g., APP4) can perform operations similar to the operations of S452, . . . , S456.

According to the embodiments explained in relation to FIG. 15, the system can confirm whether the second user (e.g., U1) allows the first user (e.g., A1) to access information of the second user via the client computer of the first user. For example, the system can obtain authorization of the second user (e.g., U1) by the client computer located at a store of Pharmacy A.

In the embodiments of FIG. 15, the client computer of the first user (e.g., A1) can provide the federation server with the authorization of the second user (e.g., U1) via the application server of the first application (APP1). In other embodiments, the client computer of the first user (e.g., A1) can directly provide the federation server with the authorization of the second user (e.g., U1) at S604 or S614, the updating section of the federation server can update the condition information in the storing section to reflect the authorization of the second user, and the checking section of the federation server can refer to the condition information in the storing section at S642.

Figures 16, 17:
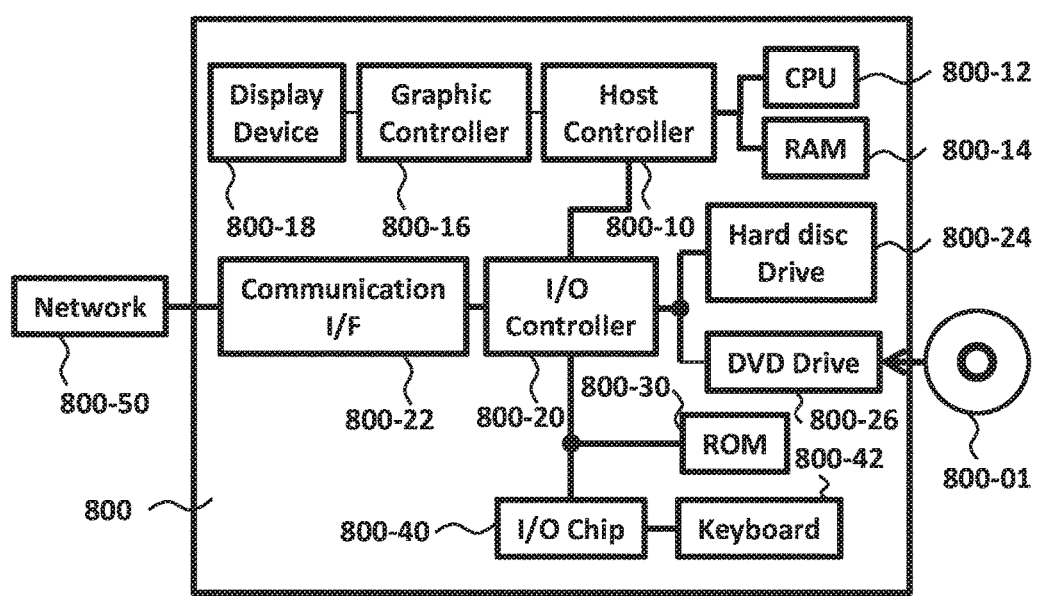
FIG. 16 shows condition information according to an embodiment of the present invention.
FIG. 17 shows an exemplary hardware configuration of a computer configured for cloud service utilization, according to an embodiment of the present invention.

FIG. 16 shows condition information according to an embodiment of the present invention. A storing section, such as the storing section 610 of the federation server 600, can store the condition information as shown in FIG. 16.

The condition information can include one or more authorizations of one or more of the second users. In an embodiment, the condition information can include a plurality of entries each including information of a requester that requires access to information of the second user, a data holder that has information of the second user, and the second user ID of the second user.

In an embodiment, the condition information can further include an access range. In the embodiment, the access range can specify a record in which the first user is authenticated to access the information of the second user. In an embodiment, the access range can include at least one of a time when the information of the second user ID is recorded on the second application, and a record of the information of the second user ID on the second application.

In the embodiment of FIG. 16, one entry for one second user of the condition information includes (i) the first user ID (shown as App1) of the first application APP1 as Requester, (ii) an identification of a second application (shown as App4) of the second application APP4 as Data holder, (iii) the second user ID (shown as u4), (iv) a time range (shown as November 1-November 30), (v) a record range (shown as [r1-r10]), in which (iv) and (v) can correspond to the access range.

The condition information of FIG. 16 indicates that the first user having the first user ID: App1 can access specific records [r1-r10] and records made between November 1-November 30 of the second user having the second user ID: u4 for the second application APP4. While the condition information of FIG. 16 includes only one entry, the condition information includes a plurality of entries in some embodiments.

In the embodiments explained in relation to FIGS. 10-16, the plurality of applications (e.g., APP1, . . . , APP4) can be provided by Pharmacies, and can store medication records. In other embodiments, the plurality of applications can be provided by other entities (e.g., hospital, web service providers, stores, security companies, education institution, public institutions, etc.), and can store a variety of personal data of a plurality of users.

In the embodiments above, the client computer of the first user can only access a single application (e.g., APP4). In other embodiments, the client computer of the first user can access a plurality of applications by utilizing the operations explained in FIG. 13B, FIG. 14 or FIG. 15.

For example, the converting section can convert the first user ID (e.g., App1) into a plurality of second user IDs (e.g., u4, u3) of the second user (e.g., U1) at S444, S544, or S644, and the federation server can perform the operations of S446, S546, or S646 and so on for the plurality of applications (e.g., APP4 and APP3) corresponding to each of the second user IDs. For example, the client computer of the first user can display a plurality of windows or tabs, each displaying an application service from each of the plurality of application servers.

FIG. 17 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program can be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 can also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method can be constituted by realizing the operation or processing of information in accordance with the usage of the computer 800.

For example, when communication is performed between the computer 800 and an external device, the CPU 800-12 can execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 can then write back the processed data to the external recording medium.

Various types of information, such as various types of programs, data, tables, and databases, can be stored in the recording medium to undergo information processing. The CPU 800-12 can perform various types of processing on the data read from the RAM 800-14, which includes various types of operations, processing of information, condition judging, conditional branch, unconditional branch, search/replace of information, etc., as described throughout this description and designated by an instruction sequence of programs, and writes the result back to the RAM 800-14.

In addition, the CPU 800-12 can search for information in a file, a database, etc., in the recording medium. For example, when a plurality of entries, each having an attribute value of a first attribute is associated with an attribute value of a second attribute, are stored in the recording medium, the CPU 800-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer program product including one or more computer readable storage mediums collectively storing program instructions for user identification and authentication that are executable by a processor or programmable circuitry to cause the processor or programmable circuitry to perform operations comprising:

configuring a plurality of identification (ID) federations between a federation server and a plurality of applications such that each ID federation is between the federation server and one of the plurality of applications;

receiving a first authentication request for authenticating a first user who has been authenticated on a first application among the plurality of applications with a first user ID using an ID federation between the first application and the federation server from among the plurality of ID federations;

checking the first user ID to determine that the first user is authorized to access information of a second user on a second application among the plurality of applications; and sending a second authentication request to a second application among the plurality of applications, the second authentication request for authenticating the first user with a second user ID, which is associated with the second user, using an ID federation between the federation server and the second application from among the plurality of ID federations.

2. The computer program product according to claim 1, wherein the receiving includes receiving an identification of the second application with the first authentication request.

3. The computer program product according to claim 2, wherein the sending includes sending the second authentication request in response to determining that the first user is authorized to access information of the second user ID.

4. The computer program product according to claim 1, wherein the sending includes sending authority information of the first user ID.

5. The computer program product according to claim 1, wherein the first user ID includes a user ID of the first user, or, an identification of the first application.

6. The computer program product according to claim 2, wherein the checking includes:
obtaining condition information; and
checking whether the first user ID, the second application, and the second user ID satisfy a condition defined in the condition information.

7. The computer program product according to claim 6, wherein the condition information includes at least one of a time when the information of the second user ID is recorded on the second application, and a record of the information of the second user ID on the second application.

8. The computer program product according to claim 6, wherein the processor or programmable circuitry perform further operations comprising:
receiving an authorization of the second user from a client computer of the second user; and
updating the condition information to reflect the authorization of the second user.

9. The computer program product according to claim 8, wherein the receiving a first authentication request comprises receiving the first authentication request from the first application.

10. The computer program product according to claim 6, wherein the processor or programmable circuitry perform further operations comprising:
receiving an authorization of the second user from the first application.

11. The computer program product according to claim 10, wherein the authorization of the second user includes a password input by the second user.

12. An apparatus for user identification and authentication, comprising:
a processor or programmable circuitry operably coupled to a memory, the memory storing program instructions that are executable to cause the processor or programmable circuitry to perform operations comprising:
configuring a plurality of identification (ID) federations between a federation server and a plurality of applications such that each ID federation is between the federation server and one of the plurality of applications;
receiving a first authentication request for authenticating a first user who has been authenticated on a first application among the plurality of applications with a first user ID using an ID federation between the first application and the federation server from among the plurality of ID federations;
checking the first user ID to determine that the first user is authorized to access information of a second user on a second application among the plurality of applications; and
sending a second authentication request to a second application among the plurality of applications, the second authentication request for authenticating the first user with a second user ID, which is associated with the second user, using an ID federation between the federation server and the second application from among the plurality of ID federations.

13. A system for user identification and authentication, comprising:
a first application server operable to execute a first application;
a second application server operable to execute a second application
a processor or programmable circuitry operably coupled to a memory, the memory storing program instructions that are executable to cause the processor or programmable circuitry to perform operations comprising:
configuring a plurality of identification (ID) federations between a federation server and a plurality of applications such that each ID federation is between the federation server and one of the plurality of applications;
receiving a first authentication request for authenticating a first user who has been authenticated on the first application among the plurality of applications with a first user ID using an ID federation between the first application and the federation server from among the plurality of ID federations;
checking the first user ID to determine that the first user is authorized to access information of a second user on the second application among the plurality of applications; and
sending a second authentication request to a second application among the plurality of applications, the second authentication request for authenticating the first user with a second user ID, which is associated with the second user, using an ID federation between the federation server and the second application from among the plurality of ID federations.

14. The system according to claim 13, wherein the second application server is configured to:
receive the second authentication request from the apparatus; and
send a notification to a client computer of the second user in response to receiving the second authentication request from the apparatus.

15. The system according to claim 13, wherein the second application server is configured to:
receive the second authentication request from the apparatus;
authorize reading of the information of the second user on the second application; and
prohibit writing of the information of the second user on the second application in response to receiving the second authentication request from the apparatus.

* * * * *